(12) United States Patent
Park et al.

(10) Patent No.: US 11,472,170 B2
(45) Date of Patent: Oct. 18, 2022

(54) WINDOW JIG COMPLEX STRUCTURE, AND APPARATUS AND METHOD FOR FABRICATING DISPLAY DEVICE

(71) Applicant: Samsung Display Co., LTD., Yongin-si (KR)

(72) Inventors: Jong Deok Park, Seoul (KR); Hyun Seung Koh, Seongnam-si (KR); Dong Hwan Kong, Bucheon-si (KR); Young Su Kim, Gunpo-si (KR); Suk Won Jung, Hwaseong-si (KR); Seon Beom Ji, Seoul (KR); In Bom Hwang, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 20 days.

(21) Appl. No.: 17/123,880

(22) Filed: Dec. 16, 2020

(65) Prior Publication Data

US 2021/0331456 A1    Oct. 28, 2021

(30) Foreign Application Priority Data

Apr. 22, 2020    (KR) .......................... 10-2020-0048819

(51) Int. Cl.
*B32B 37/10*    (2006.01)
*B32B 38/00*    (2006.01)
*B32B 37/16*    (2006.01)

(52) U.S. Cl.
CPC .............. *B32B 37/10* (2013.01); *B32B 37/16* (2013.01); *B32B 38/0012* (2013.01); *B32B 2457/20* (2013.01)

(58) Field of Classification Search
CPC ..... B32B 38/1866; B32B 2457/20–208; Y10T 156/1028; H01L 2251/5338; H01L 51/0097; H01L 51/56; G02F 1/1303; G02F 1/133331; G02F 1/133305; G06F 1/1652

See application file for complete search history.

(56) References Cited

U.S. PATENT DOCUMENTS

| | | | | |
|---|---|---|---|---|
| 2017/0100922 A1* | 4/2017 | Kim | .......................... | H04B 1/00 |
| 2018/0056638 A1* | 3/2018 | Choi | ................... | B32B 38/1808 |
| 2019/0315111 A1* | 10/2019 | Chen | ................... | B32B 38/1866 |

FOREIGN PATENT DOCUMENTS

| | | |
|---|---|---|
| KR | 10-2013-0032626 | 4/2013 |
| KR | 10-2017-0050843 | 5/2017 |

* cited by examiner

*Primary Examiner* — Carson Gross
(74) *Attorney, Agent, or Firm* — Kile Park Reed & Houtteman PLLC

(57) ABSTRACT

A window jig complex structure includes a window jig and a protective cap extended from the window jig. The window jig includes a main jig part having longer sides extended in a first direction and shorter sides extended in a second direction, a first short side jig part bent from one of the shorter sides of the main jig part in a thickness direction at a first side of the main jig part, and a second short side jig part bent from another of the shorter sides of the main jig part at a second side of the main jig part. The protective cap is coupled with the second short side jig part.

21 Claims, 28 Drawing Sheets

20: 21, 22, 23, 24, 25

20: 21, 22, 23, 24, 25

100: CL1, CL2, CL3, CL4, GR1, GR2, GR3, GR4, SP, ST, 10, GF

100: CL1, CL2, CL3, CL4, GR1, GR2, GR3, GR4, SP, ST, 10, GF

100: CL1, CL2, CL3, CL4, GR1, GR2, GR3, GR4, SP, ST, 10, GF

100: CL1, CL2, CL3, CL4, GR1, GR2, GR3, GR4, SP, ST, 10, GF

WINDOW JIG COMPLEX STRUCTURE, AND APPARATUS AND METHOD FOR FABRICATING DISPLAY DEVICE

CROSS REFERENCE TO RELATED APPLICATION(S)

This application claims priority to and benefits of Korean Patent Application No. 10-2020-0048819 under 35 U.S.C. § 119, filed in the Korean Intellectual Property Office on Apr. 22, 2020, the entire contents of which are incorporated herein by reference.

BACKGROUND

1. Technical Field

The disclosure relates to a window jig complex structure including a protective cap, and an apparatus and a method for fabricating a display device that attaches a display panel to a curved window of a display device.

2. Description of the Related Art

Electronic devices that provide images to a user such as a smart phone, a tablet PC, a digital camera, a laptop computer, a navigation device and a smart TV include a display device for displaying images. Such a display device may include a display panel for generating and displaying images and various input means.

Among display devices, an organic light-emitting display device displays images by using an organic light-emitting element that produces light as electrons and holes recombine. Such an organic light-emitting display device can be driven with fast response speed, high luminance, large viewing angle and low power consumption.

Recently, a curved display device displaying images not only on the front surface but also on the side surfaces (or curved surfaces) has emerged. The curved display device may include a curved window and a curved display panel attached to the curved window. Each of the curved window and the curved display panel may have a shape conforming to the shape of the curved display device.

An external device such as a driver chip and/or a printed circuit film may be mounted on a side surface of the curved display panel. The side surface may be longer than the other side surfaces of the curved display panel. As next generation mobile communications technology (e.g., 5G) may be applied, many channels may be required, and the length of the printed circuit film tends to be increased.

Accordingly, in case that the curved window fixed to the window jig may be laminated on the display panel, the longer side surface where an external device may be mounted and/or the printed circuit film may interfere with the window jig. This may result in driving failure.

SUMMARY

Aspects of the disclosure provide a window jig complex structure that can prevent interference of a display panel and a printed circuit film with a window jig.

Aspects of the disclosure provide an apparatus for fabricating a display device that may include a window jig complex structure that can prevent interference of a display panel and a printed circuit film with a window jig.

Aspects of the disclosure provide a method of fabricating a display device that can prevent interference of a display panel and a printed circuit film with a window jig.

According to an embodiment, a window jig complex structure may include a window jig and a protective cap extended from the window jig. The window jig may include a main jig part having longer sides extended in a first direction and shorter sides extended in a second direction, a first short side jig part bent from one of the shorter sides of the main jig part in a thickness direction at a first side of the main jig part, and a second short side jig part bent from another of the shorter sides of the main jig part at a second side of the main jig part. The protective cap may be coupled with the second short side jig part.

The window jig may further include a first long-side jig part bent from one of the longer sides of the main jig part in the thickness direction at a third side of the main jig part, and a second long-side jig part bent from another of the longer sides of the main jig part in the thickness direction at a fourth side of the main jig part.

The window jig may include an inner surface, an outer surface opposite to the inner surface, and a lower surface extending the inner surface to the outer surface. The protective cap may cover the lower surface of the second short side jig part.

The protective cap may be coupled to the lower surface of the second short side jig part.

The window jig may further include a protrusion protruding from the lower surface of the second short side jig part, the protective cap may further include a groove engaged with the protrusion, and the protrusion may be accommodated in the groove.

The window jig may further include a magnet disposed in the second short side jig part, and the protective cap may include a conductive material.

The window may be mounted on the inner surface of the window jig, an end of the window adjacent to the second short side jig part of the window may protrude downward from the lower surface of the second short side jig part, the window may include an inner surface, an outer surface opposite to the inner surface, and a lower surface extending the inner surface to the outer surface, and the protective cap may cover the outer surface of the window and the lower surface of the window.

A window may be mounted on the inner surface of the window jig, a lower surface of the second short side jig part may protrude downward from an end of the window that is adjacent to the second short side jig part, the window may include an inner surface, an outer surface opposite to the inner surface, and a lower surface extending the inner surface to the outer surface, and the protective cap may cover the lower surface of the window and a part of the inner surface of the second short side jig part.

The window jig may include an inner surface, an outer surface opposite to the inner surface, and a lower surface extending the inner surface to the outer surface, the protective cap may cover a lower end of the outer surface of the second short side jig part and the lower surface, the protective cap may be coupled with the outer surface of the second short side jig part, the window jig may further include a protrusion protruding from the outer surface of the second short side jig part, the protective cap may further include a groove engaged with the protrusion, and the protrusion may be accommodated in the groove.

According to another embodiment, an apparatus for fabricating a display device may include a stage, a shape pad on the stage, and a window jig complex structure disposed on the shape pad and including a window jig and a protective cap extended from the window jig, wherein the window jig may include a main jig part having longer sides extended in a first direction and shorter sides extended in a second direction, a first short side jig part bent from one of the shorter sides of the main jig part in a thickness direction at a first side of the main jig part, and a second short side jig part bent from another of the shorter sides of the main jig part at a second side of the main jig part, and wherein the protective cap may be coupled with the second short side jig part.

The window jig may further include a first long-side jig part bent from one of the longer sides of the main jig part in the thickness direction at a third side of the main jig part, and a second long-side jig part bent from another of the longer sides of the main jig part in the thickness direction at a fourth side of the main jig part.

The apparatus may further include a guide film disposed between the shape pad and the window jig complex structure, at least one clamp fixing an end of the guide film, and at least one guide roller extended from the clamp and disposed on the guide film.

The guide film may include a main film part, a first film part located at one side of the main film part in the first direction, a second film part located at an opposite side of the main film part in the first direction, a third film part located at one side of the main film part in a second direction crossing the first direction, and a fourth film part located at an opposite side of the main film part in the second direction, and wherein the main film part may overlap the shape pad in the thickness direction.

The at least one clamp may include a plurality of clamps, and the plurality of clamps may draw and fix an end of the first film part, an end of the second film part, an end of the third film part and an end of fourth film part, respectively.

The at least one guide roller may include a plurality of guide rollers, the plurality of guide rollers may be extended from the plurality of clamps, respectively, the plurality of guide rollers may be disposed between the main film part and the ends of the first to fourth film parts, and the plurality of guide rollers may lower the first film part, the second film part, the third film part, and the fourth film part, respectively.

According to yet another embodiment, a method of fabricating a display device may include disposing a display panel on a shape pad, the display panel including a main display area including longer sides extended in a first direction and shorter sides extended in a second direction, and edge areas extended from the main area; curving the edge areas of the display panel; and attaching a curved window on the display panel having the curved edge areas by using a window jig complex structure. The edge areas may comprise a first edge area at a side of the main display area in the second direction, a second edge area at an opposite side of the main display area in the second direction, a third edge area at a side of the main display area in the first direction, and a fourth edge area at an opposite side of the main display area in the first direction, the fourth edge area being longer than the third edge area. The window jig complex structure may include a window jig, and a protective cap extended from the window jig. The window jig may include a main jig part in line with the main display area, a first long-side jig part covering the first edge area, a second long-side jig part covering the second edge area, a first short side jig part covering the third edge area, and a second short side jig part covering the fourth edge area. The protective cap may be coupled to the second short side jig part.

The display panel may further include a driver chip disposed in a first pad area of the fourth edge area, and a printed circuit film disposed on a second pad area of the fourth edge area.

The disposing of the display panel may include disposing the display panel on a guide film on the shape pad, and the guide film may include a main film part covering the main display area, a first film part covering the first edge area, a second film part covering the second edge area, a third film part covering the third edge area, and a fourth film part covering the fourth edge area.

The disposing of the display panel may include fixing ends of the first film part, the second film part, the third film part, and the fourth film part by clamps.

The curving of the edge areas of the display panel may include lowering the first film part, the second film part, the third film part, and the fourth film part by guide rollers extended from the clamps to bend the first edge area, the second edge area, the third edge area, and the fourth edge area of the display panel from the main display area.

The attaching of the curved window on the display panel may include lowering the curved window or raising the display panel.

The protective cap may cover the fourth edge area of the display panel.

It should be noted that objects of the disclosure are not limited to the above-mentioned object; and other objects of the invention will be apparent to those skilled in the art from the following descriptions.

According to an embodiment of the disclosure, it is possible to prevent interference of a display panel and a printed circuit film with a window jig.

Adhesion characteristics between the display panel and the window can be improved.

It should be noted that effects of the disclosure are not limited to those described above and other effects of the disclosure will be apparent to those skilled in the art from the following descriptions.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
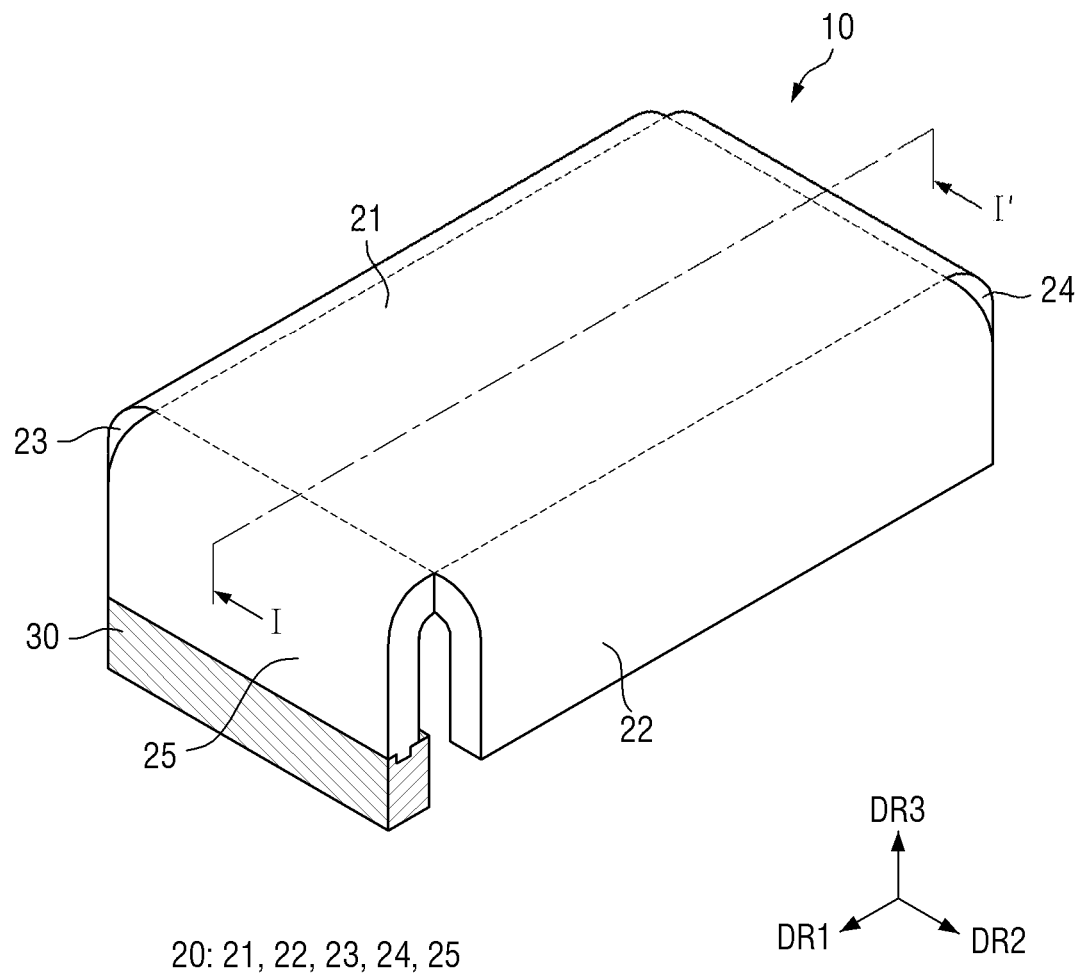
FIG. 1 is a schematic perspective view of a window jig complex structure according to an embodiment of the disclosure.

Hereinafter, embodiments of the invention will be described with reference to the attached drawings. Throughout the specification, the same reference numerals will refer to the same or like parts.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims, including their equivalents.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "has," "have,", "having", "includes", "including", and the like, when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

The term "overlap" may include layer, stack, face or facing, extending over, extending under, covering or partly covering or any other suitable term as would be appreciated and understood by those of ordinary skill in the art. The expression "not overlap" may include "apart from" or "set aside from" or "offset from" and any other suitable equivalents as would be appreciated and understood by those of ordinary skill in the art.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a schematic perspective view of a window jig complex structure according to an embodiment of the disclosure.

Referring to FIG. 1, the window jig complex structure 10 according to an embodiment of the disclosure may include a window jig 20 and a protective cap 30 extended to the window jig 20. The window jig 20 may include a main jig part 21 and at least one side jig part extended to the main jig part 21.

The main jig part 21 may have a rectangular shape when viewed from the top. The main jig part 21 may include, for example, longer sides extended in a first direction DR1 and shorter sides extended in a second direction DR2. The main jig part 21 may be located in a plane including the first direction DR1 and the second direction DR2.

In the following descriptions, the first direction DR1 and the second direction DR2 may cross each other, for example, the first direction DR1 may be perpendicular to the second direction DR2 when viewed from the top. The third direction DR3 may cross the plane where the first direction DR1 and the second direction DR2 may be located, for example, the third direction DR3 may be perpendicular to both the first direction DR1 and the second direction DR2. In FIG. 1, the first direction DR1 may be the same as the direction in which the longer sides of the main jig part 21 may be extended, and the second direction DR2 may be the same as the direction in which the shorter sides of the main jig part 21 may be extended. It should be understood that the directions referred to with respect to the embodiments may be relative directions, and the embodiments are not limited to the directions mentioned.

There may be multiple side jig parts. The side jig parts may be bent in the thickness direction from the respective sides of the main jig part 21 (e.g., the third direction DR3) and extended. For example, the side jig parts may include a first long-side jig part 22, a second long-side jig part 23, a first short side jig part 24, and a second short side jig part 25.

The first long-side jig part 22 may be bent in the thickness direction from another longer side of the main jig part 21 in the second direction DR2 and extended, the second long-side jig part 23 may be bent in the thickness direction from one longer side of the main jig part 21 in the second direction DR2, the first short side jig part 24 may be bent in the thickness direction from one shorter side of the main jig part 21 in the first direction DR1, and the second short side jig part 25 may be bent in the thickness direction from another shorter side of the main jig part 21 in the first direction DR1.

The window jig 20 may serve to fix a curved window, which will be described later. The curved window may include a main window part corresponding to the main jig part 21 of the window jig 20, and side window parts corresponding to the jig parts 22 to 25, respectively. The side window parts may be bent in the thickness direction from the sides of the main window part, respectively, and may be extended. The degree or angle by which the jig parts 22 to 25 are bent from the main jig part 21 may be equal to or less than the degree or angle by which the side window parts of the curved window are bent from the main window part.

For example, the side window parts may have a curvature, may be bent and extended from the boundaries (or sides) with the main window part, and may be extended in the thickness direction from the point where the bending ends. In such case, in order to conform to the side window parts, the jig parts 22 to 25 may have a curvature, may be bent and extended from the boundaries with the main window part 21 (the side of the main jig part 21), and may be extended in the thickness direction from the point where the bending ends.

In some embodiments, the side window parts may be bent from the boundaries (or sides) with the main window part with substantially no curvature, i.e., approximately at the right angle, and may be extended in the thickness direction. In such case, the jig parts 22 to 25 may be bent with substantially no curvature, i.e., approximately at the right angle from the boundaries with the main jig part 21 (the sides of the main jig part 21), and may be extended in the thickness direction.

The lengths that the jig parts 22 to 25 may be extended in their extending directions, (e.g., the second direction DR2 for the long-side jig parts, and the first direction DR1 for the short side jig parts) may be equal to one another.

The jig parts 22 to 25 may be extended to the main jig part 21, and adjacent ones of the jig parts 22 to 25 may be spaced apart from one another. For example, the first long-side jig part 22 may be disposed spaced apart from the adjacent second short side jig part 25 and the adjacent first short side jig part 24, and the second long-side jig part 23 may be disposed spaced apart from the adjacent second short side jig part 25 and the adjacent first short side jig part 24. It is, however, to be understood that the disclosure is not limited thereto. The jig parts 22 to 25 may be extended to one another.

The protective cap 30 may be extended to at least one side jig part. For example, the protective cap 30 may be extended to the second short side jig part 25.

The protective cap 30 may include a conductive material. For example, the protective cap 30 may include a metal, a metal alloy, a metal oxide, or a combination thereof. For example, the protective cap 30 may include, but is not limited to, aluminum (Al), stainless steel SUS, or a combination thereof.

Figure 2:
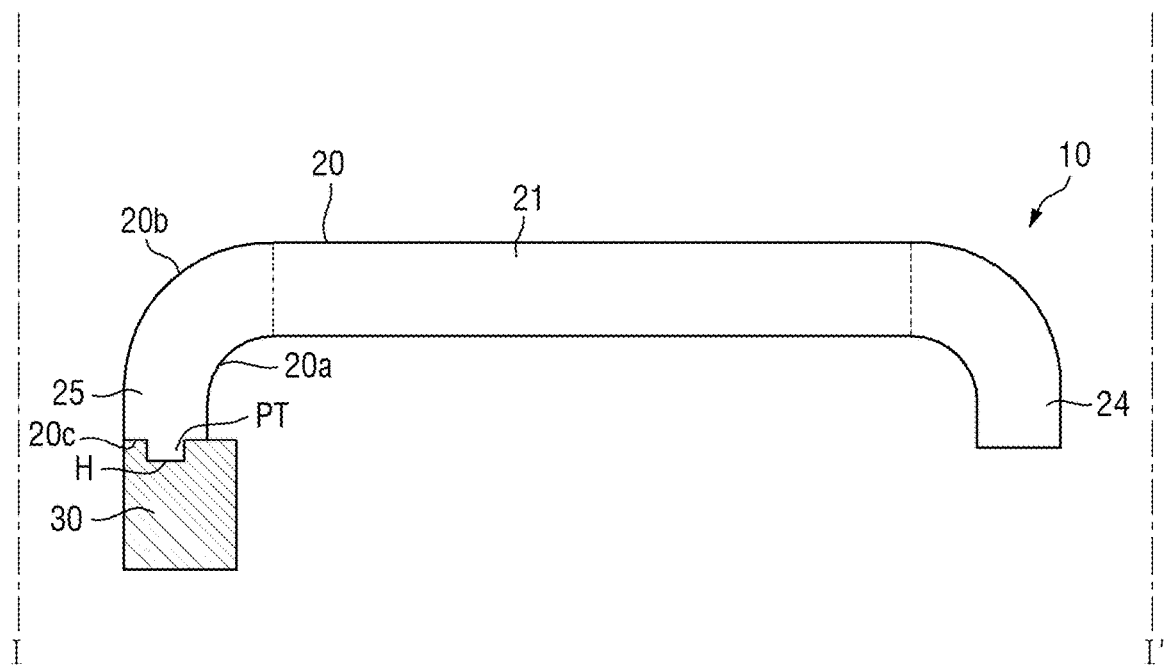
FIG. 2 is a schematic cross-sectional view taken along line I-I' in FIG. 1.
Figure 2:
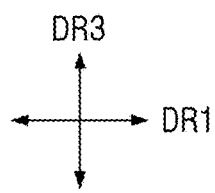

FIG. 2 is a schematic cross-sectional view taken along line I-I' in FIG. 1.

Referring to FIG. 2, the window jig 20 may include an inner surface 20a, an outer surface 20b, and a lower surface 20c connecting the inner surface 20a with the outer surface 20b. As described later, a curved window may be disposed on (e.g., directly on) the inner surface 20a of the window jig 20. In such case, the curved window may be in contact with the inner surface 20a of the window jig 20 and may be spaced apart from the outer surface 20b of the window jig 20.

The curved window may serve to protect a display panel PN. The curved window may be made of a transparent material. The curved window may include glass, plastic, or a combination thereof, for example.

In case that the curved window includes glass, the glass may be ultra thin glass (UTG) or thin glass. In case that the glass is formed as ultra thin glass or thin glass, it may have flexibility and may be curved, bent, folded or rolled. The thickness of the glass may be, for example, in the range of about 10 µm to about 300 µm, and specifically about 30 µm to about 80 µm or approximately 50 µm. The glass of the curved window may include soda lime glass, alkali alumino silicate glass, borosilicate glass, lithium alumina silicate glass, or a combination thereof. The glass of the curved window may include chemically or thermally tempered glass to have a high strength. The chemical tempering may be carried out via an ion exchange process in an alkali salt. The ion exchange process may be performed two or more times.

In case that the curved window includes a plastic, it may be more advantageous to exhibit flexible characteristics such as folding. Examples of plastics applicable to the curved window may include, but are not limited to, polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymer, polyethersulphone (PES), polyetherimide (PEI), polyphenylene sulfide (PPS), polyallylate, tri-acetyl cellulose (TAC), cellulose acetate propionate (CAP), and the like, or a combination thereof. The plastic curved window may include one or more of the plastic materials listed above.

Each of the inner surface 20a and the outer surface 20b of the window jig 20 may be located across the main jig part 21, the first short side jig part 24, and the second short side jig part 25. The lower surface 20c of the window jig 20 may be located at the short side jig parts 24 and 25.

The window jig 20 may further include a protrusion PT protruding from the lower surface 20c of the second short side jig part 25 in the thickness direction (e.g., the third direction DR3). The protrusion PT may be located at the center of the lower surface 20c of the second short side jig part 25, but the position of the protrusion PT on the lower surface 20c is not limited thereto. The protrusion PT may be used to couple the window jig 20 with the protective cap 30.

The protective cap 30 may include an accommodating groove H engaging with the protrusion PT of the window jig 20. The protrusion PT of the window jig 20 may be accommodated in the accommodating groove H of the protective cap 30 so that the protective cap 30 can be coupled with the window jig 20. The shape of the protrusion PT and the shape of the accommodating groove H are not particularly limited as long as the protrusion PT may be inserted into the accommodating groove H.

The protective cap 30 may be coupled with the window jig 20 in a variety of ways well known in the art. For example, as described above, the protective cap 30 may be coupled with the window jig 20 by inserting the protrusion PT into the accommodating groove H. As another example, a nut may be formed as the accommodating groove H, and a bolt may be formed as the protrusion PT, so that the protective cap 30 may be coupled with the window jig 20 by using the bolt and the nut. The accommodating groove H may be coupled with the protrusion PT by using an adhesive.

The outer surface of the protective cap 30 may be aligned with the outer surface 20b of the window jig 20, and the inner surface of the protective cap 30 may protrude inward from the inner surface 20a of the window jig 20. A curved window may be disposed on the inner surface of the protective cap 30 protruding inward from the inner us 20a of the window jig 20, which will be described later.

Figure 3:
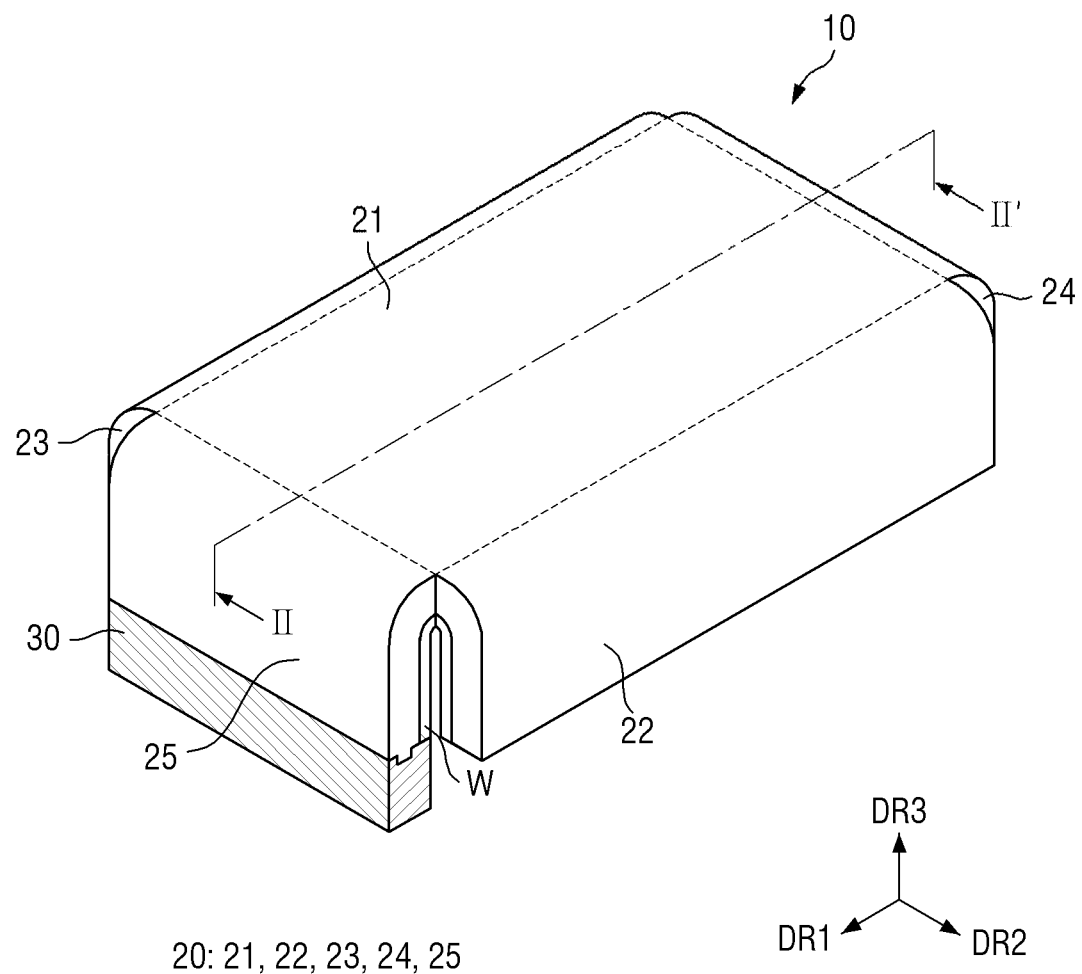
FIG. 3 is a schematic perspective view showing a curved window fixed to a window jig complex structure according to an embodiment of the disclosure.
Figure 4:
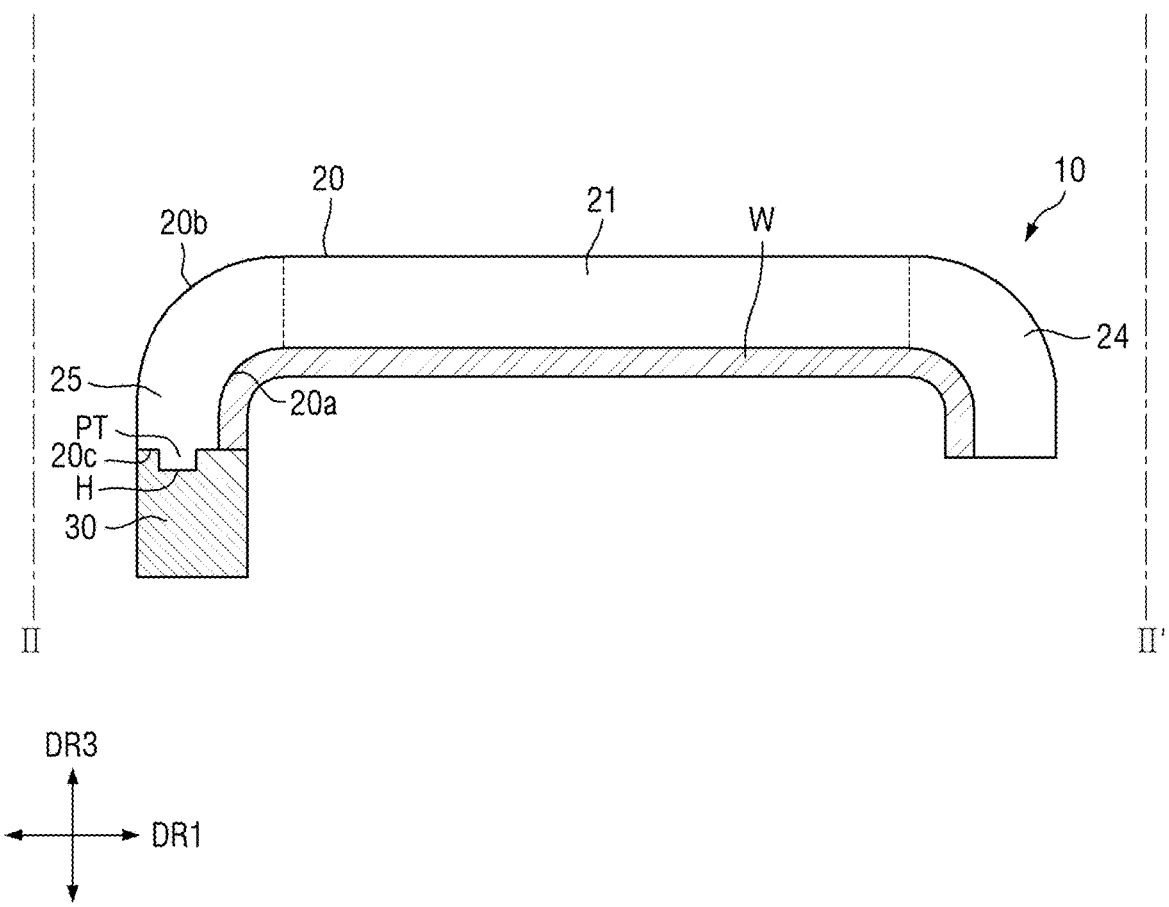
FIG. 4 is a schematic cross-sectional view taken along line II-II' in FIG. 3.

FIG. 3 is a schematic perspective view showing a curved window fixed to a window jig complex structure according to an embodiment of the disclosure. FIG. 4 is a schematic cross-sectional view taken along line II-II' in FIG. 3.

Referring to FIGS. 3 and 4, a curved window W may be disposed on the inner surface 20a of the window jig 20. The main window part may be disposed in line with the main jig part 21, and the side window parts may be disposed in line with the respective jig parts 22 to 25. For example, the first side window part may be in line with the first long-side jig part 22, the second side window part may be in line with the second long-side jig part 23, the third side window part may be in line with the first short side jig part 24, and the fourth side window part may be in line with the second short side jig part 25.

Originally, the side window parts may not be bent from the main window part but may be located on the same plane as the main window part. In case that the main window part and the side window parts that are not bent from the main window part are placed and fixed on the window jig 20, the side window part may be bent from the main window part in the thickness direction along the shape of the respective jig parts 22 to 25.

The degree by which the side window parts of the curved window may be bent from the main window part may be equal to or larger than the degree or angle by which the side jig parts 22 to 25 of the main jig part 21 are bent.

The window jig 20 may fix the curved window W for lamination between the curved window W and the display panel PN (see FIG. 5), which will be described later. The window jig 20 may fix the curved window W by using, for example, vacuum holes. Specifically, vacuum holes may be formed at the main jig part 21 of the window jig 20 where the curved window W is disposed and at the jig parts 22 to 25, so that the curved window W may be fixed to the window jig 20 by the vacuum holes. It is to be noted that the technique by which the window jig 20 fixes the curved window W is not limited thereto, and various well-known techniques may be applied.

The curved window W may include an inner surface, an outer surface, and a lower surface connecting the inner surface of the curved window W with the outer surface of the curved window W. In case that the curved window W is fixed to the window jig 20 by the above-described vacuum holes, the outer surface of the curved window W may be in contact with the inner surface 20a of the window jig 20.

The lower surfaces 20c of the jig parts 21 to 25 of the window jig 20 may be aligned with the ends (or lower surfaces) of the side window parts of the curved window W associated with the jig parts 21 to 25, respectively. The protective cap 30 may cover the end (or lower surface) of the second side window part of the curved window W, the lower surface 20c of the second short side jig part 25 and the protrusion PT in the thickness direction. The protective cap 30 may be in contact with the end (or lower surface) of the second side window part of the curved window W and the lower surface 20c of the second short side jig part 25.

The protective cap 30 can prevent a printed circuit film FPC (see FIG. 5) attached to the display panel PN from being bent, the edge area of the display panel PN where the printed circuit film FPC is attached from being bent, etc.

Figure 5:
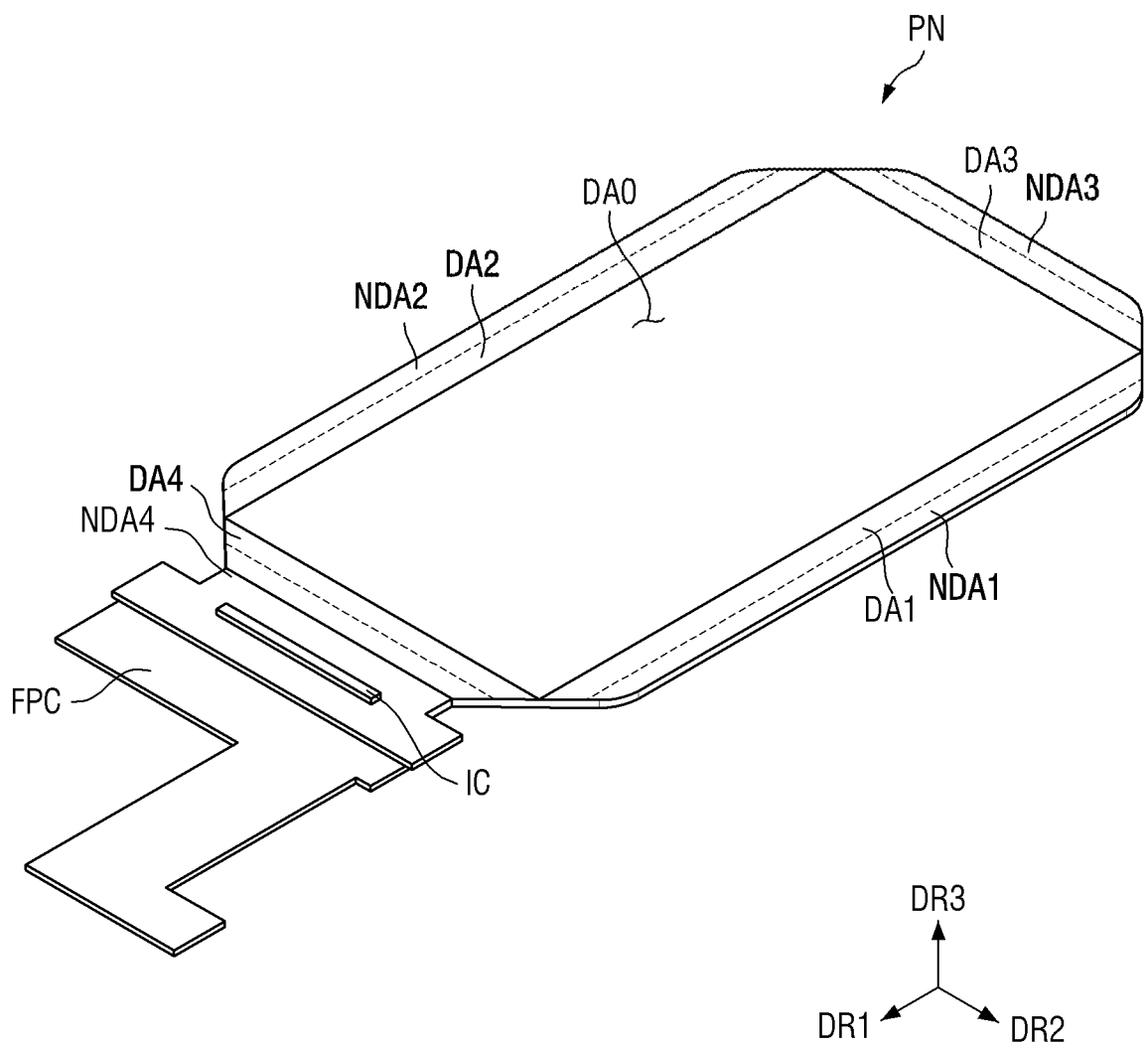
FIG. 5 is a schematic perspective view of a display panel according to an embodiment of the disclosure.
Figure 6:
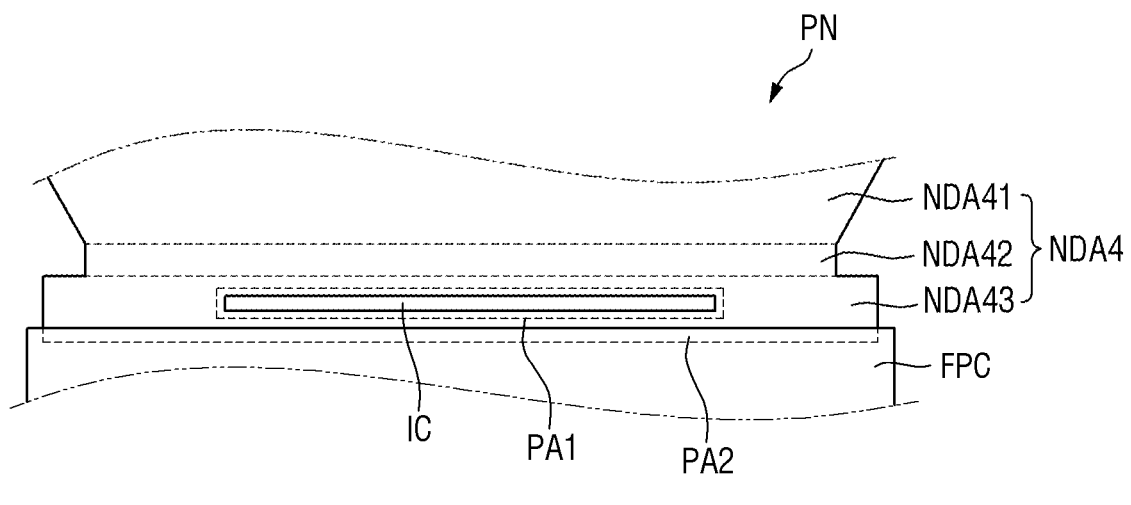
FIG. 6 is a schematic plan view showing a fourth non-display area, a driver chip and a printed circuit film of the display panel of FIG. 5.
Figure 6:
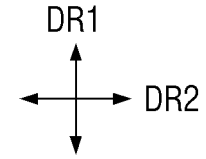

FIG. 5 is a schematic perspective view of a display panel according to an embodiment of the disclosure. FIG. 6 is a schematic plan view showing a fourth non-display area, a driver chip and a printed circuit film of the display panel of FIG. 5.

Referring to FIGS. 5 and 6, examples of the display panel PN may include an organic light-emitting display panel, a micro LED display panel, a nano LED display panel, a quantum-dot display panel, a liquid-crystal display panel, a plasma display panel, a field emission display panel, an electrophoretic display panel, an electrowetting display panel, etc. In the following description, an organic light-emitting display panel may be employed as an example of the display panel PN.

The shape of the display panel PN may be substantially identical to the shape of the curved window W.

The display panel PN may include a main area and edge areas positioned around the main area. The main area of the display panel PN may be located at the center of the display panel PN, and the edge areas of the display panel PN may be located at the edge of the main area. In the main area of the display panel PN, a main display area DA0 that may display images may be located. Pixels may be disposed in the main display area DA0.

The edge areas may be located at the border of the main display area DA0.

The first edge area may be located on a side of the main display area DA0 in the second direction DR2, the second edge area may be located on another side of the main display area DA0 in the second direction DR2, the third edge area may be located on a side of the main display area DA0 in the first direction DR1, and the fourth edge area may be located on another side of the main display area DA0 in the first direction DR1. Each of the edge areas may be extended to the main display area DA0.

The outer profile of the first edge area may include a first profile having a curved shape convex toward one side in the first direction DR1 and one side in the second direction DR2 and adjacent to the fourth edge area, a second profile extended in the first direction DR1, and a third profile symmetrical to the first profile in the second direction DR2 and adjacent to the third edge area. The first to third profiles may be connected continuously in this order.

The outer profile of the second edge area may be symmetrical to the outer profile of the first edge area in the first direction DR1.

The outer profile of the third edge area may include a fourth profile adjacent to the first edge area and having a curved shape convex toward one side in the first direction DR1 and one side in the second direction DR2, a fifth profile extended in the second direction DR2, and a sixth profile symmetrical to the fourth profile in the first direction DR1 and adjacent to the second edge area.

The fourth edge area may include a seventh profile extended from the first edge area to another side in the first direction DR1 and another side in the second direction DR2, an eighth profile extended to the seventh profile and extended to another side in the first direction DR1, a ninth profile extended to the eighth profile and extended to one side in the second direction DR2, a tenth profile extended to the ninth profile and extended to another side in the first direction DR1, an eleventh profile extended to the tenth profile and extended to another side in the second direction DR2, a twelfth profile extended to the eleventh profile and symmetrical to the tenth profile in the first direction DR1, a thirteenth profile extended to the twelfth profile and symmetrical to the ninth profile in the first direction DR1, a fourteenth profile extended to the thirteenth profile and symmetrical to the eighth profile in the first direction DR1, and a fifteenth profile extended to the fourteenth profile, symmetrical to the seventh profile in the first direction DR1, and adjacent to the second edge area.

Each of the edge areas may include a display area and a non-display area. The display area of each of the edge areas may display images and may include pixels. The non-display area of each of the edge areas may not display images and may not include pixels.

The first edge area may include a first display area DA1 and a first non-display area NDA1, the second edge area may include a second display area DA2 and a second non-display area NDA2, the third edge area may include a third display area DA3 and a third non-display area NDA3, and the fourth edge area may include a fourth display area DA4 and a fourth non-display area NDA4.

The first display area DA1 may be located between the first non-display area NDA1 and the main display area DA0, the second display area DA2 may be located between the second non-display area NDA2 and the main display area, the third display area DA3 may be located between the third non-display area NDA3 and the main display area DA0, and the fourth display area DA4 may be located between the fourth non-display area NDA4 and the main display area DA0.

The fourth non-display area NDA4 may include a first subsidiary non-display area NDA41 in contact with the fourth display area DA4, a second subsidiary non-display area NDA42 spaced apart from the fourth display area DA4 with the first subsidiary non-display area NDA41 therebetween, and a third subsidiary non-display area NDA43 spaced apart from the first subsidiary non-display area NDA41 with the second subsidiary non-display area NDA42.

The outer profile of the first subsidiary display area NDA41 may include a part from the point where the first subsidiary non-display area NDA41 of the seventh profile meets the fourth display area DA4 to the point where the seventh profile meets the eighth profile, and a part from the point where the first subsidiary non-display area NDA41 of the fifteenth profile meets the fourth display area DA4 to the point where the fifteenth profile meets the fourteenth profile. The outer profile of the second subsidiary display area NDA42 may include an eighth profile and a fourteenth profile. The outer profile of the third subsidiary display area NDA43 may include a ninth profile, a tenth profile, an eleventh profile, a twelfth profile, and a thirteenth profile.

The widths of the subsidiary display areas NDA41 to NDA43 in the second direction DR2 may be different from one another. For example, the width of the second subsidiary non-display area NDA42 extended in the second direction DR2 may be smaller than the width of the first subsidiary non-display area NDA41 extended in the second direction DR2, and the width of the third subsidiary non-display area NDA43 extended in the second direction DR2.

First pads electrically connected to the driver chip IC and first signal lines electrically connected to the first pads may be disposed in the third subsidiary non-display area NDA43. The driver chip IC may be coupled on the first pads of the third subsidiary non-display area NDA43. The driver chip IC may include a data integrated circuit and/or a sensing integrated circuit.

Second pads electrically connected to the printed circuit film FPC and second signal lines electrically connected to the second pads may be disposed at the end of the third subsidiary non-display area NDA43. The printed circuit film FPC may be coupled on the second pads of the third subsidiary non-display area NDA43. The printed circuit film FPC may further include a connector electrically connected to an external device. The printed circuit film FPC may transmit a variety of driving signals applied through the connector to the driver chip IC and/or the pixels in each display area of the display panel PN.

Each of the edge areas of the display panel PN in the example shown in FIG. 5 may be bent and extended from the main display area DA0 in the thickness direction via a linear deformation process of the display panel PN to be described.

Via a linear deformation process of the display panel PN in the example shown in FIG. 5, the edge areas bent and extended from the main display area DA0 in the thickness direction may be attached in line with the side window parts of the curved window W (see FIG. 3).

Figure 7:
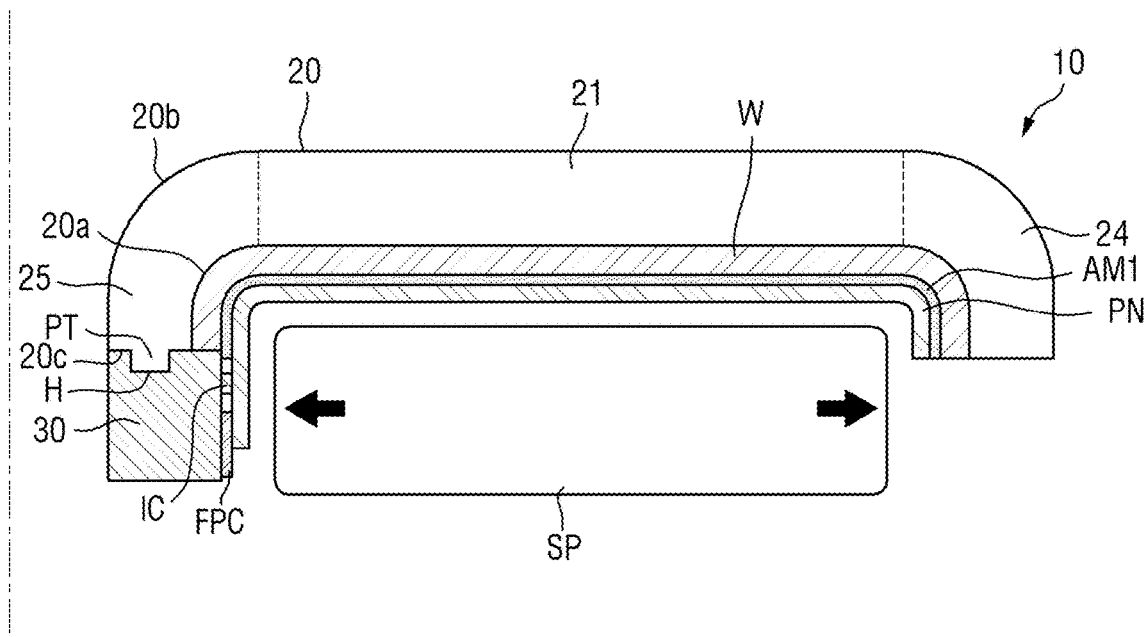
FIG. 7 is a schematic view showing that a protective cap supports a display panel and a printed circuit film from the outside during a lamination process between a curved window and a display panel.
Figure 7:
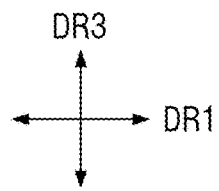

FIG. 7 is a schematic view showing that a protective cap may support a display panel and a printed circuit film from the outside during a lamination process between a curved window and a display panel.

Referring to FIGS. 5, 6, and 7, the first edge area of the display panel PN may be coupled with the second side window part of the curved window W, the second edge area of the display panel PN may be coupled with the first side window part of the curved window W, the third edge area of the display panel PN may be coupled with the third side window part of the curved window W, and the fourth edge area of the display panel PN may be coupled with the third side window part of the curved window W.

In this regard, since the driver chip IC and the printed circuit film FPC may be further disposed in the fourth edge area of the display panel PN, the fourth edge area of the display panel PN may have a larger length in its extending direction (e.g., the first and second edge areas may be extended in the second direction DR2 and the third and fourth edge areas may be extended in the first direction DR1) than the first to third edge areas.

The printed circuit film FPC disposed at the fourth edge area may protrude from the end of the fourth edge area (third subsidiary non-display area NDA43) toward the outside.

As described above, the edge areas of the display panel PN shown in FIG. 5 may be bent from the main display area DA0 in the thickness direction via a linear deformation process so that they conform to the respective jig parts 22 to 25 (see FIGS. 1 and 2) of the window jig 20 (see FIGS. 1 and 2) fixing the curved window W to be coupled.

In an embodiment where the lengths of the jig parts 22 to 25 extended in their the extending directions (e.g., the second direction DR2 for the long-side jig parts, and the first direction DR1 for the short side jig parts) may all be equal, the ends of the first to third edge areas of the display panel PN may be aligned with lower surfaces 20c (see FIG. 2) of the jig parts 22 to 24, but the peripheral portion including the end of the fourth edge area of the display panel PN and the printed circuit film FPC may protrude downward from the lower surface 20c of the second short side jig part 25. In other words, in the thickness direction, there may be a significant difference between the end of the printed circuit film FPC and the lower surface 20c of the second short side jig part 25 of the window jig 20.

As will be described, in case that the curved window W fixed to the window jig 30 may be brought into contact with the first coupling member AM1 disposed on the surface of the display panel PN and a pressure may be applied from above the window jig 20 using a lamination device, the main window part of the curved window W may be coupled with the main display area DA0 of the display panel PN firstly, and the shape pad SP may be expanded to the outside in the first direction DR1 (hereinafter referred to as the expansion direction) due to the pressure applied from the above. The shape pad SP expanded in the first direction DR1 moves the edge areas of the display panel PN in the expansion direction, so that the edge areas of the display panel PN may be coupled with the respective side window parts of the curved window W via the third coupling member AM3. The first coupling member AM1 may be an optically transparent coupling member. The optically transparent coupling member may include an optically clear adhesive (OCA), an optically clear resin (OCR), or a combination thereof.

During the process of coupling the edge areas of the display panel PN with the respective side window parts of the curved window W via the first coupling member AM1, the peripheral portion including the end of the fourth edge area of the display panel PN protruding downward from the lower surface 20c of the second short side jig part 25 and the printed circuit film FPC may be bent in the expansion direction by the fourth side window part of the curved window W and the second short side jig part 25.

At the fourth edge area of the display panel PN, first pads may be electrically connected to the driver chip IC, first signal lines may be electrically connected to the first pads, second pads may be electrically connected to the printed circuit film FPC, and second signal lines may be electrically connected to the second pads, as described above with reference to FIG. 5. Accordingly, if the peripheral portion including the end of the fourth edge area is bent, the first signal lines and the second signal lines may be disconnected. If the first signal lines and the second signal lines are disconnected, driving failure may occur. If the printed circuit film FPC that transmits a variety of driving signals to the driver chip IC and/or pixels in each display area of the display panel PN is bent, a variety of signal lines on the printed circuit film FPC may also be disconnected. If the various circuit signal lines on the printed circuit film FPC are disconnected, driving failure may occur.

In this regard, as described above, the window jig complex structure 10 according to the embodiment of the disclosure may include a protective cap 30 that covers the end (or lower surface) of the second side window part of the curved window W, and the lower surface 20c of the second short side jig part 25 in the thickness direction. The protective cap 30 can support the peripheral portion including the end of the fourth edge area of the display panel PN protruding downward from the lower surface 20c of the second short side jig part 25 and the printed circuit film FPC on the outer side (e.g., in the expansion direction). More specifically, the protective cap 30 may be coupled with the lower surface 20c of the second short side jig part 25 to compensate for the difference between the second short side jig part 25 and the peripheral portion including the end of the fourth edge area and/or between the second short side jig part 25 and the printed circuit film FPC.

In this manner, during the process of coupling the edge areas of the display panel PN with the respective side window parts of the curved window W via the first coupling member AM1, it may be possible to prevent the peripheral portion including the end of the fourth edge area of the display panel PN protruding downward from the lower surface 20c of the second short side jig part 25 and the printed circuit film FPC from being bent in the expansion direction by virtue of the protective cap 30.

Accordingly, it may be possible to prevent that the first signal lines and the second signal lines are disconnected, which may occur in case that the peripheral portion including the end of the fourth edge area and/or the printed circuit film FPC that transmits various driving signals to the driver chip IC and/or pixels in each display area of the display panel PN are bent. As a result, it may be possible to prevent driving failure.

Hereinafter, window jig complex structures according to other embodiments of the disclosure will be described. In the following description, the same or similar elements will be denoted by the same or similar reference numerals, and redundant descriptions will be omitted or briefly described.

Figure 8:
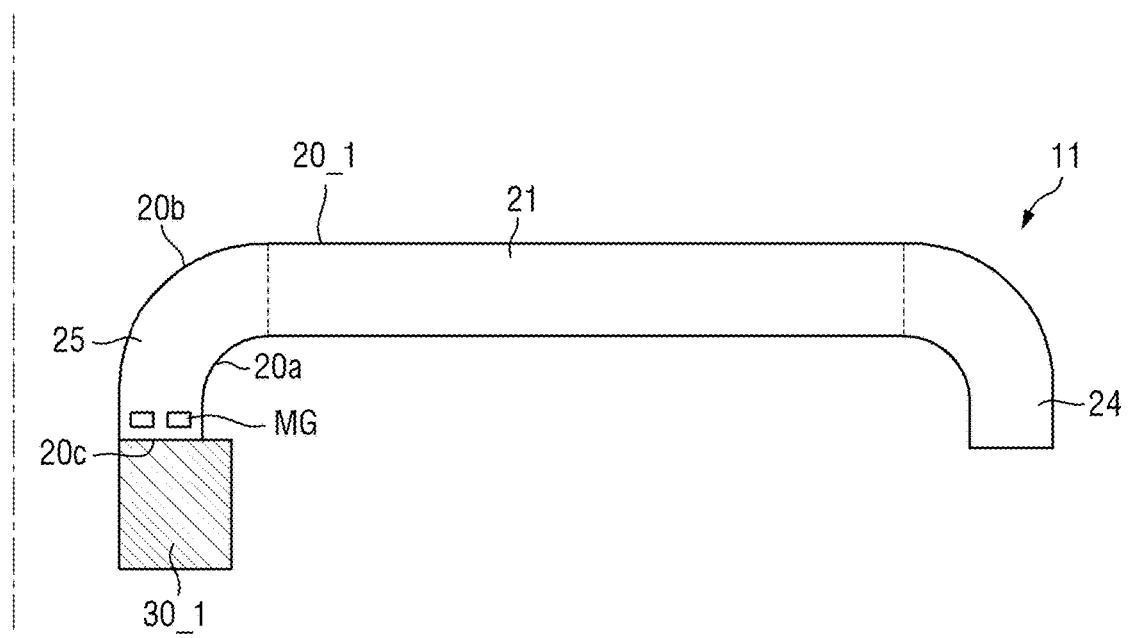
FIG. 8 is a schematic cross-sectional view of a window jig composite according to another embodiment of the disclosure.

FIG. 8 is a schematic cross-sectional view of a window jig complex structure according to another embodiment of the disclosure.

A window jig complex structure 11 according to the embodiment of FIG. 8 may be different from the window jig complex structure 10 according to the embodiment of FIG. 2 in that magnets MG may be disposed in a second short side jig part 25.

More specifically, the magnets MG may be disposed in the second short side jig part 25 of the window jig complex structure 11 according to this embodiment. Since a magnetic force may be generated between the magnets MG of a window jig 20_1 and a protective cap 30_1 including a conductive material, the window jig 20_1 and the protective cap 30_1 may be coupled together. According to this embodiment, the protrusion PT described above with reference to FIG. 2 may not be formed on the lower surface 20c of the second short side jig part 25, and the accommodating groove H described above with reference to FIG. 2 may not be formed in the protective cap 30_1.

Figure 9:
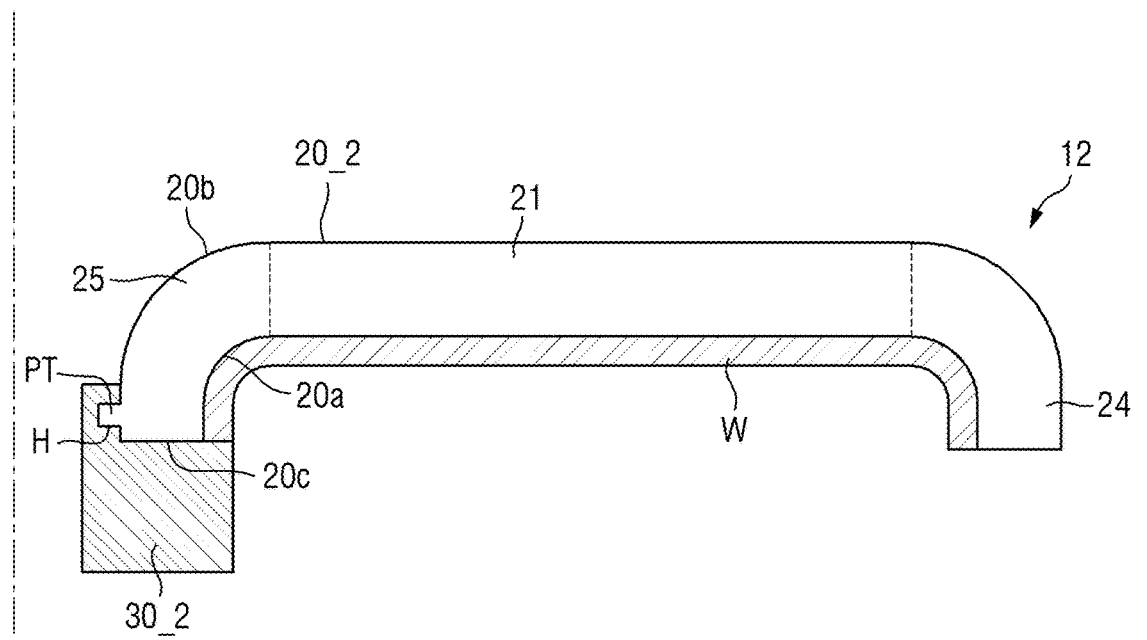
FIG. 9 is a schematic cross-sectional view of a window jig complex structure according to yet another embodiment of the disclosure.
Figure 9:
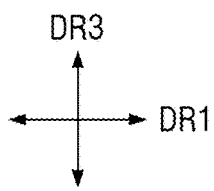

FIG. 9 is a schematic cross-sectional view of a window jig complex structure according to yet another embodiment of the disclosure. FIG. 9 further shows a curved window W in order to illustrate the protrusion relationship between the curved window W and a window jig 20_2.

A window jig complex structure 12 according to the embodiment of FIG. 9 may be different from the window jig complex structure 10 according to the embodiment of FIG. 2 in that a protective cap 30_2 may further cover an outer surface 20b of a second short side jig part 25 of a window jig 20_2.

More specifically, the protective cap 30_2 of the window jig complex structure 12 according to the embodiment further covers the outer surface 20b of the second short side jig part 25 of the window jig 20_2.

A protrusion PT may be formed to protrude outward from the outer surface 20b of the second short side jig part 25. An indentation groove H may be formed at a location that covers the outer surface 20b of the second short side jig part 25 of the window jig 20_2 in order to accommodate the protrusion PT protruding outward from the outer surface 20b of the second short side jig part 25. The protective cap 30_4 may be coupled on the outer surface 20b of the second short side jig part 25 of the window jig 20_2.

Figure 10:
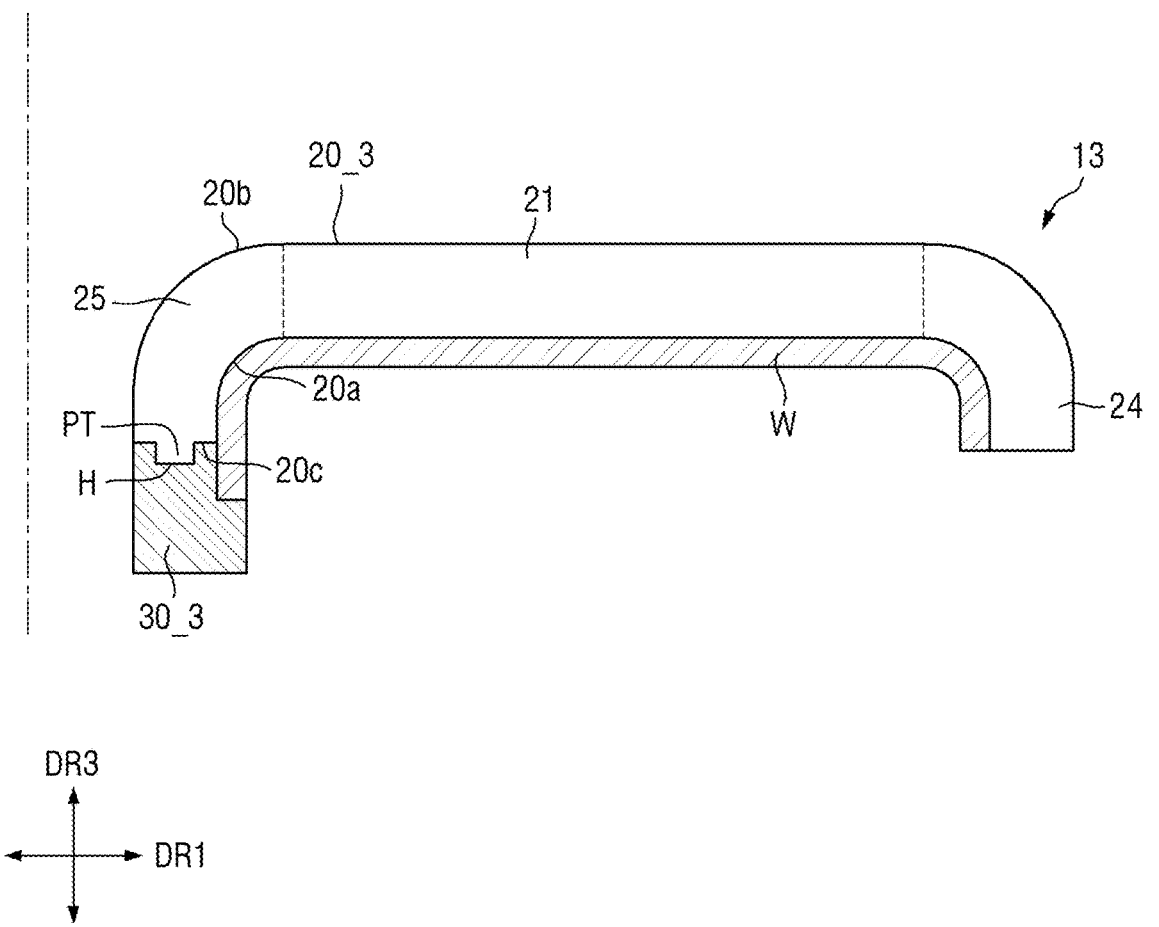
FIG. 10 is a schematic cross-sectional view of a window jig complex structure according to yet another embodiment of the disclosure.

FIG. 10 is a schematic cross-sectional view of a window jig complex structure according to yet another embodiment of the disclosure.

A window jig complex structure 13 according to the embodiment of FIG. 10 may be different from the window jig complex structure 10 according to the embodiment of FIG. 2 in that an end of a fourth side window part of a curved window W may further protrude from a lower surface 20c of a second short side jig part 25 of a window jig 20_3 in the thickness direction.

More specifically, in the window jig complex structure 13 according to the embodiment of the disclosure, the end of the fourth side window part of the curved window W may further protrude from the lower surface 20c of the second short side jig part 25 of the window jig 20_3 in the thickness direction.

A protective cap 30_3 may further cover an outer surface and a lower surface of a fourth side window part of the curved window W that further protrudes in the thickness direction from a lower surface 20c of the second short side jig part 25 of the window jig 20_3.

Figure 11:
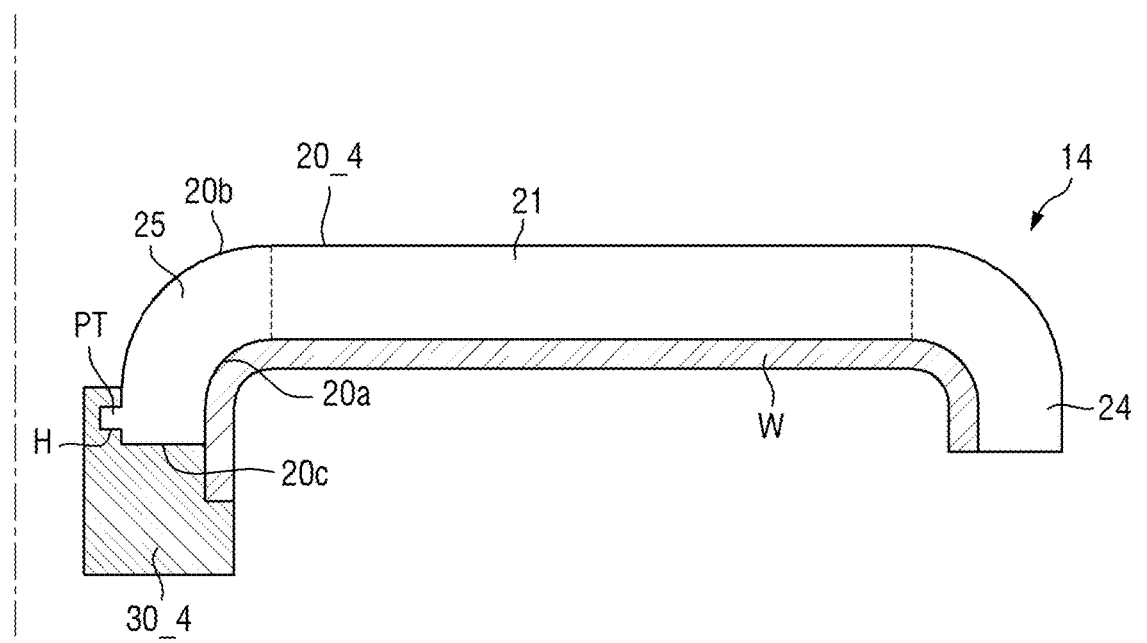
FIG. 11 is a schematic cross-sectional view of a window jig complex structure according to yet another embodiment of the disclosure.
Figure 11:
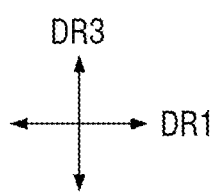

FIG. 11 is a schematic cross-sectional view of a window jig complex structure according to yet another embodiment of the disclosure.

A window jig complex structure 14 according to the embodiment of FIG. 11 may be different from the window jig complex structure 13 according to the embodiment of FIG. 10 in that a protective cap 30_4 may further cover an outer surface 20b of a second short side jig part 25 of a window jig 20_4.

More specifically, the protective cap 30_4 of the window jig complex structure 14 according to the embodiment further covers the outer surface 20b of the second short side jig part 25 of the window jig 20_4. In the window jig complex structure 14 according to the embodiment of the disclosure, the end of the fourth side window part of the curved window W may further protrude from the lower surface 20c of the second short side jig part 25 of the window jig 20_4 in the thickness direction.

A protrusion PT may be formed to protrude outward from the outer surface 20b of the second short side jig part 25. An indentation groove H may be formed at a location that covers the outer surface 20b of the second short side jig part 25 of the window jig 20_4 in order to accommodate the protrusion PT protruding outward from the outer surface 20b of the second short side jig part 25. The protective cap 30_4 may be coupled on the outer surface 20b of the second short side jig part 25 of the window jig 20_4.

Figure 12:
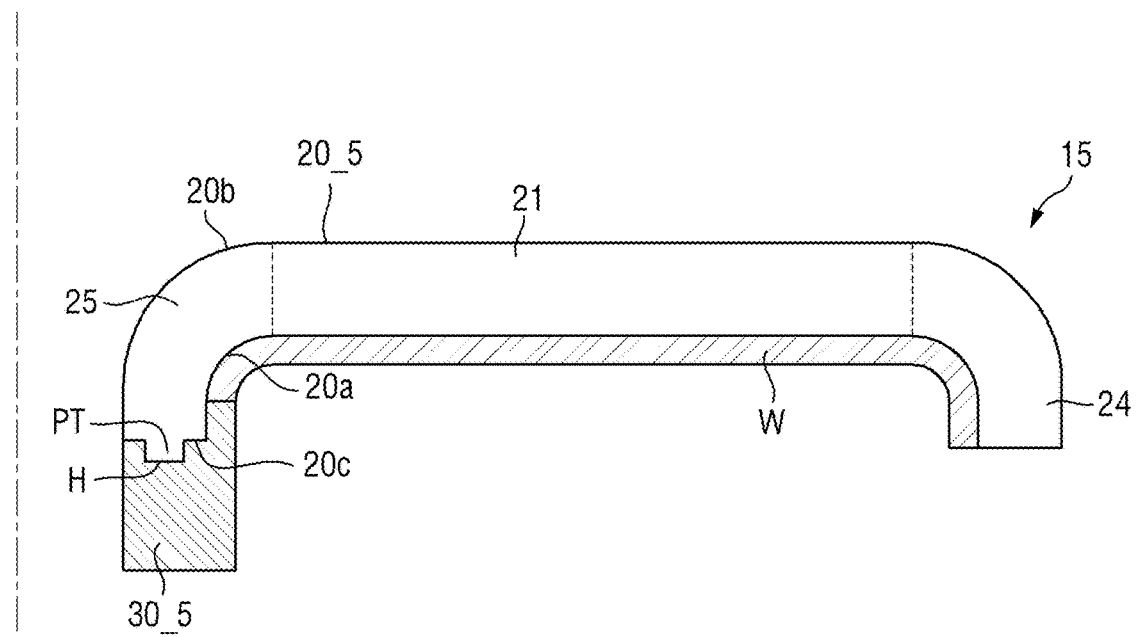
FIG. 12 is a schematic cross-sectional view of a window jig complex structure according to yet another embodiment of the disclosure.
Figure 12:
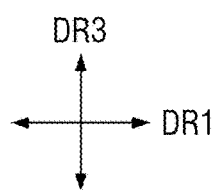

FIG. 12 is a schematic cross-sectional view of a window jig complex structure according to yet another embodiment of the disclosure.

A window jig complex structure according to the embodiment of FIG. 12 may be different from the window jig complex structure 10 according to the embodiment of FIG. 2 in that a lower surface 20c of the second short side jig part 25 of the window jig 20_5 may further protrude from an end of a fourth side window part of a curved window W in the thickness direction.

More specifically, in the window jig complex structure 15 according to the embodiment of the disclosure, a lower surface 20c of a second short side jig part 25 of a window jig 20_5 may further protrude from an end of a fourth side window part of a curved window W in the thickness direction.

The fourth side window part of the curved window W may expose the lower end of the inner surface 20a of the second short side jig part 25, and a protective cap 30_5 may further cover the lower end of the inner surface 20a of the second short side jig part 25 exposed by the fourth side window part of the curved window W.

Figure 13:
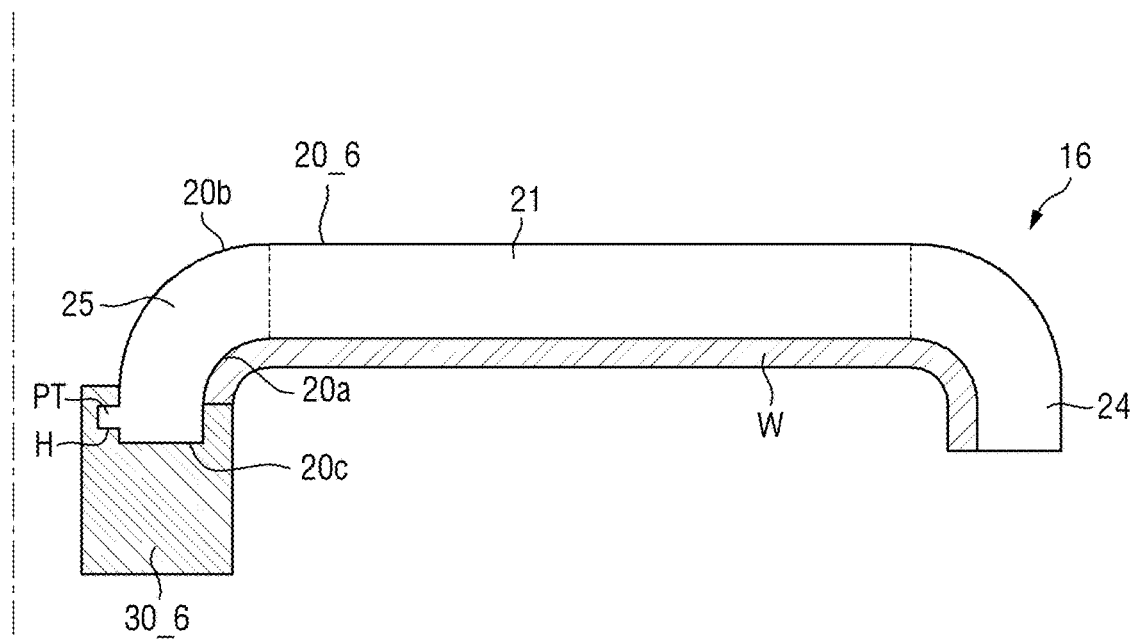
FIG. 13 is a schematic cross-sectional view of a window jig complex structure according to yet another embodiment of the disclosure.
Figure 13:
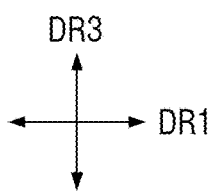

FIG. 13 is a schematic cross-sectional view of a window jig complex structure according to yet another embodiment of the disclosure.

A window jig complex structure 16 according to the embodiment of FIG. 13 may be different from the window jig complex structure 15 according to the embodiment of FIG. 12 in that a protective cap 30_6 may further cover an outer surface 20b of a second short side jig part 25 of a window jig 20_6.

More specifically, in the window jig complex structure 16 according to the embodiment of the disclosure, a lower surface 20*c* of a second short side jig part 25 of a window jig 20_5 may further protrude from an end of a fourth side window part of a curved window W in the thickness direction, and may further cover an outer surface 20*b* of the second short side jig part 25 of the window jig 20_6 of the protective cap 30_6.

A protrusion PT may be formed to protrude outward from the outer surface 20*b* of the second short side jig part 25. An indentation groove H may be formed at a location that covers the outer surface 20*b* of the second short side jig part 25 of the window jig 20_6 in order to accommodate the protrusion PT protruding outward from the outer surface 20*b* of the second short side jig part 25. The protective cap 30_6 may be coupled on the outer surface 20*b* of the second short side jig part 25 of the window jig 20_6.

Hereinafter, an apparatus 100 for fabricating display devices will be described. In the following description, the same or similar elements will be denoted by the same or similar reference numerals, and redundant descriptions will be omitted or briefly described.

Figure 14:
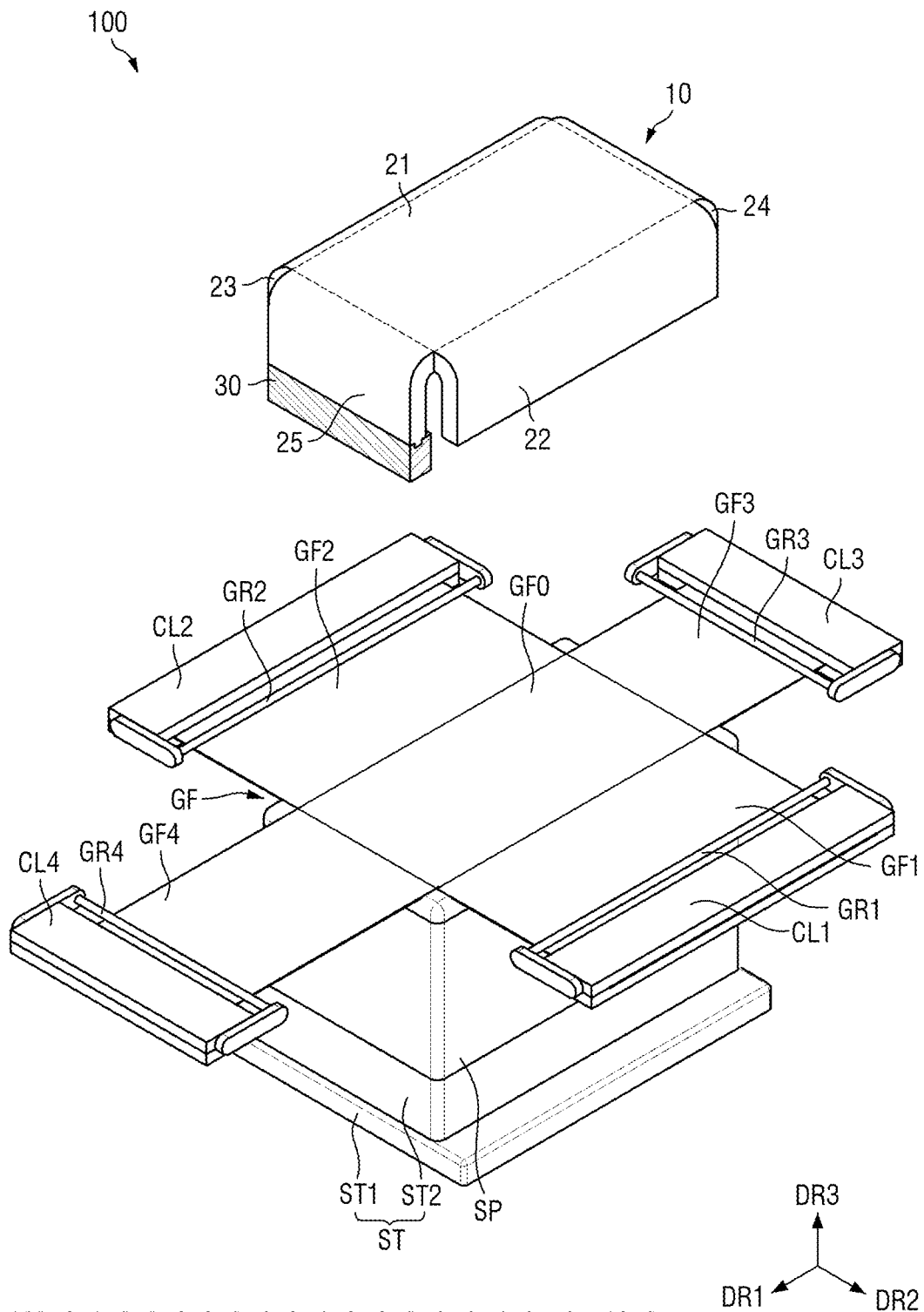
FIG. 14 is a schematic perspective view of an apparatus for fabricating display devices according to an embodiment of the disclosure.
Figure 15:
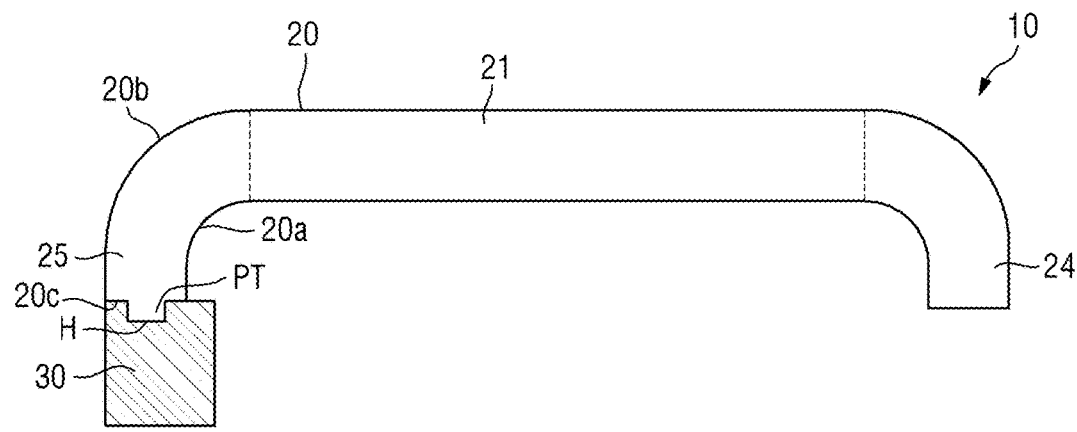
FIG. 15 is a schematic cross-sectional view of an apparatus for fabricating the display device according to FIG. 14.
Figure 15:
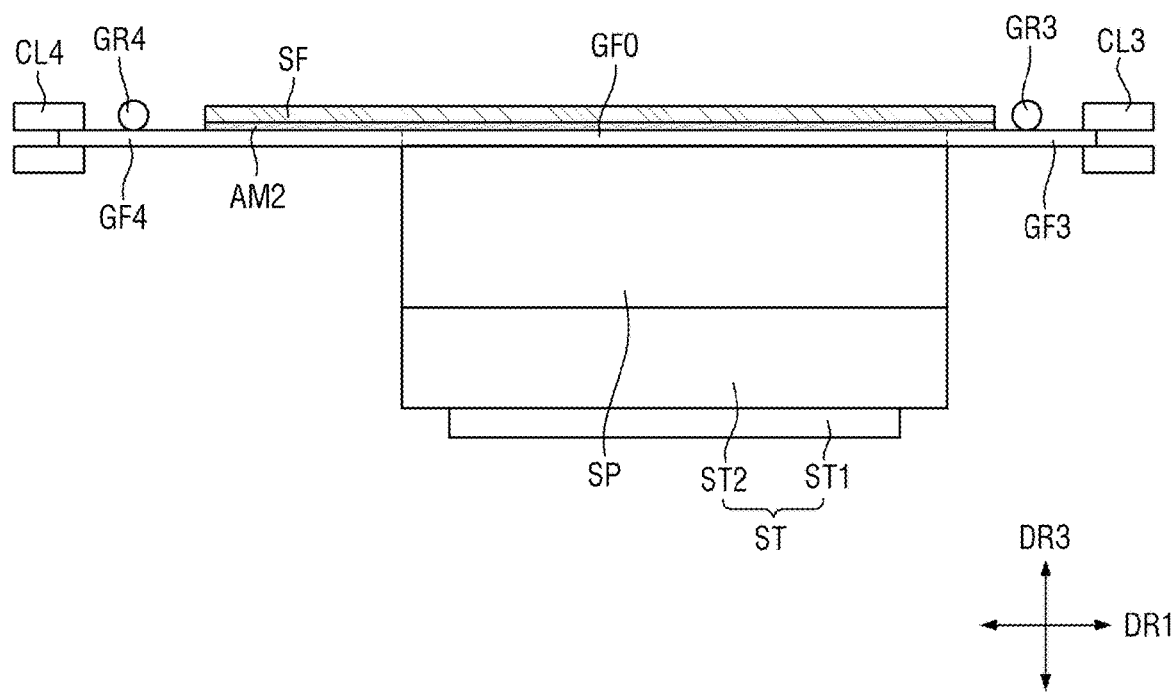

FIG. 14 is a schematic perspective view of an apparatus for fabricating display devices according to an embodiment of the disclosure. FIG. 15 is a schematic cross-sectional view of an apparatus for fabricating the display device according to FIG. 14.

Referring to FIGS. 14 and 15, the apparatus 100 for fabricating display devices according to an embodiment of the disclosure may include the window jig complex structure 10 described above with reference to FIGS. 1 to 7, a stage ST, a shape pad SP, clamps CL1 to CL4, guide rollers GR1 to GR4, and a guide film GF. It is apparent that the window jig complex structures 11 to 16 described above with reference to FIGS. 8 to 13, respectively, may be applied to the apparatus 100 as well as the window jig complex structure 10. In the following description, the apparatus 100 to which the window jig complex structure 10 may be applied will be described.

The stage ST may include a first stage ST1 at the bottom and a second stage ST2 on the first stage ST1. The stage ST may support the shape pad SP of the apparatus 100.

The shape pad SP may be disposed on the second stage ST2. The shape pad SP and the second stage ST2 may have a rectangular shape when viewed from the top. The size of the shape pad SP may be substantially equal to the size of the second stage ST2 when viewed from the top. The shape of the shape pad SP and the second stage ST2 may be similar to the shape of the main jig part 21 of the window jig 20 of the window jig complex structure 10 described above. For example, the shape of each of the shape pad SP and the second stage ST2 may include longer sides extended in the first direction DR1 and shorter sides extended in the second direction DR2. The shape pad SP may include a flexible material. The shape pad SP may include, for example, rubber, a fluid material, or a combination thereof.

The guide film GF or an adhesive sheet may be disposed on the shape pad SP. The guide film GF may include a main film part GF0 and film parts GF1 to GF4. According to a method of fabricating a display device including a process of attaching a display panel to a curved window, which will be described later, the guide film GF may cover and support the display panel, and ends of the film parts GF1 to GF4 may be fixed by the respective clamps CL1 to CL4. The guide film GF having the ends of the film parts GF1 to GF4 fixed by the clamps CL1 to CL4 may allow the first to fourth edge areas of the display panel on the film parts GF1 to GF4 to be bent together with the film parts GF1 to GF4 may be bent in case that the clamps CL1 to CL4 may be lowered.

The main film part GF0 may be located at the center of the guide film GF. The main film part GF0 may have substantially the same shape as the shape pad SP when viewed from the top. The main film part GF0 may have a rectangular shape when viewed from the top. The main film part GF0 may include longer sides extended in the first direction DR1 and shorter sides extended in the second direction DR2.

The first film part GF1 may be located on one side of the main film part GF0 in the second direction DR2, the second film part GF2 may be located on another side of the main film part GF0 in the second direction DR2, the third film part GF3 may be located on one side of the main film part GF0 in the first direction DR1, and the fourth film part GF4 may be located on another side of the main film part GF0 in the first direction DR1. Each of the film parts GF1 to GF4 may be extended to the main film part GF0.

The first film part GF1 may protrude toward one side in the second direction DR2 from a longer side of the main film part GF0 (the longer side located on one side in the second direction DR2). The second film part GF2 may protrude toward another side in the second direction DR2 from another longer side of the main film part GF0 (the longer side located on the opposite side in the second direction DR2). The third film part GF3 may protrude toward one side in the first direction DR1 from a shorter side of the main film part GF0 (the shorter side located on one side in the first direction DR1). The fourth film part GF4 may protrude toward another side in the first direction DR1 from another shorter side of the main film part GF0 (the shorter side located on the opposite side in the first direction DR1).

Each of the plurality of film parts GF1 to GF4 may have a rectangular shape when viewed from the top. For example, each of the film parts GF1 to GF4 may have a rectangular or square shape when viewed from the top.

The size of the shape of the main film part GF0 may be larger than the size of the shape of each of the plurality of film parts GF1 to GF4 when viewed from the top.

Although the size of the shape of the first film part GF1 may be equal to the size of the shape of the second film part GF2 when viewed from the top, the disclosure is not limited thereto. The size of the shape of the first film part GF1 may be different from the size of the shape of the second film part GF2 when viewed from the top.

The size of the shape of the third film part GF3 may be smaller than the size of the shape of the fourth film part GF4 when viewed from the top. In other words, the shape of the fourth film part GF4 may be larger than the shape of the third film part GF3 when viewed from the top.

The guide film GF may further include a release film SF and a second coupling member AM2. The release film SF may be removed in case that the display panel may be disposed on the guide film GF. The display panel may be attached to the second coupling member AM2. The release film SF may be disposed across the main film part GF0 and the film parts GF1 to GF4. The second coupling member AM2 may overlap the release film SF and may have the same size as the display panel to be described later in the method of fabricating display devices.

Each second coupling member AM2 may include an adhesive. The second coupling member AM2 may include an ultraviolet curing adhesive, an ultraviolet curing resin, or a combination thereof, that may be cured in response to ultraviolet rays.

The second coupling member AM2 may be attached to the display panel and may be removed from the display panel after the display panel and the curved window may be attached together. In order to easily remove the second coupling member AM2 from the display panel by ultraviolet irradiation, the second coupling member AM2 may include an adhesive or a resin that cures in response to ultraviolet light, as described above.

The main film part GF0 of the guide film GF may be disposed so that it overlaps the shape pad SP in the thickness direction. The main film part GF0 may completely overlap the shape pad SP and accordingly the film parts GF1 to GF4 may not overlap the shape pad SP in the thickness direction.

The film parts GF1 to GF4 of the guide film GF may be fixed by the clamps CL1 to CL4. The clamps CL1 to CL4 may be disposed at the ends of one surface (or upper surface) and another surface (or lower surface) of the film parts GF1 to GF4, respectively, to fix the film parts GF1 to GF4.

The first and second clamps CL1 and CL2 may be extended in the first direction DR1, while the third and fourth clamps CL3 and CL4 may be extended in the second direction DR2.

The first clamp CL1 may draw the first film part GF1 toward one side in the second direction DR2 with the first film part GF1 fixed on the surface and another surface of the first film part GF1. The second clamp CL2 may draw the second film part GF2 toward another side in the second direction DR2 with the second film part GF2 fixed on the surface and another surface of the second film part GF2. The third clamp CL3 may draw the third film part GF3 toward one side in the first direction DR1 with the third film part GF3 fixed on the surface and another surface of the third film part GF3. The fourth clamp CL4 may draw the fourth film part GF4 toward another side in the first direction DR1 with UV absorbing patterns and the fourth film part GF4 fixed on the surface (or upper surface) of a first UV absorbing pattern and another surface (or the lower surface) of a second UV absorbing pattern.

Guide rollers GR1 to GR4 may be extended to the clamps CL1 to CL4, respectively. The first guide roller GR1 may be extended to the first clamp CL1 and disposed on one surface (or upper surface) of the first film part GF1. The first guide roller GR1 may be disposed between the first clamp CL1 and the main film part GF0. The first guide roller GR1 may be extended in the first direction DR1. The second guide roller GR2 may be extended to the second clamp CL2 and disposed on the surface (or upper surface) of the second film part GF2. The second guide roller GR2 may be disposed between the second clamp CL2 and the main film part GF0. The second guide roller GR2 may be extended in the first direction DR1. The third guide roller GR3 may be extended to the third clamp CL3 and disposed on one surface (or upper surface) of the third film part GF3. The third guide roller GR3 may be disposed between the third clamp CL3 and the main film part GF0. The third guide roller GR3 may be extended in the second direction DR2. The fourth guide roller GR4 may be extended to the fourth clamp CL4 and disposed on the surface (or upper surface) of the fourth film part GF4. The fourth guide roller GR4 may be disposed on one surface (or upper surface) of a first UV absorbing pattern. The fourth guide roller GR4 may be disposed between the fourth clamp CL1 and the main film part GF0. The fourth guide roller GR4 may be extended in the second direction DR2.

Referring to FIG. 7 together, as described above, in an embodiment where the lengths of the jig parts 22 to 25 in their the extending directions (e.g., the second direction DR2 for the long-side jig parts, and the first direction DR1 for the short side jig parts) may all be equal, the ends of the first to third edge areas of the display panel PN may be aligned with lower surfaces 20c of the jig parts 22 to 24, but the peripheral portion including the end of the fourth edge area of the display panel PN and the printed circuit film FPC may protrude downward from the lower surface 20c of the second short side jig part 25. In other words, in the thickness direction, there may be a significant difference between the end of the printed circuit film FPC and the lower surface 20c of the second short side jig part 25 of the window jig 20.

In case that the curved window W fixed to the window jig 30 is brought into contact with the first coupling member AM1 disposed on the surface of the display panel PN and a pressure is applied from above the window jig 20 using a lamination device, the main window part of the curved window W may be coupled with the main display area DA0 of the display panel PN firstly, and the shape pad SP may be expanded to the outside in the first direction DR1 (hereinafter referred to as the expansion direction) due to the pressure applied from the above. The shape pad SP expanded in the first direction DR1 moves the edge areas of the display panel PN in the expansion direction, so that the edge areas of the display panel PN may be coupled with the respective side window parts of the curved window W via the third coupling member AM3.

During the process of coupling the edge areas of the display panel PN with the respective side window parts of the curved window W via the first coupling member AM1, the peripheral portion including the end of the fourth edge area of the display panel PN protruding downward from the lower surface 20c of the second short side jig part 25 and the printed circuit film FPC may be bent in the expansion direction by the fourth side window part of the curved window W and the second short side jig part 25. As a result, the first signal lines and the second signal lines may be disconnected. If the first signal lines and the second signal lines are disconnected, driving failure may occur. If the printed circuit film FPC that transmits a variety of driving signals to the driver chip IC and/or pixels in each display area of the display panel PN is bent, a variety of signal lines on the printed circuit film FPC may also be disconnected. If the various circuit signal lines on the printed circuit film FPC are disconnected, driving failure may occur.

In this regard, the window jig complex structure 10 of an apparatus 100 for fabricating a display device according to an embodiment of the disclosure may include a protective cap 30 that covers the end (or lower surface) of the second side window part of the curved window W, and the lower surface 20c of the second short side jig part 25 in the thickness direction. The protective cap 30 can support the peripheral portion including the end portion of the fourth edge area of the display panel PN protruding downward from the lower surface 20c of the second short side jig part 25 and the printed circuit film FPC on the outer side (e.g., in the expansion direction). More specifically, the protective cap 30 may be coupled with the lower surface 20c of the second short side jig part 25 to compensate for the difference between the second short side jig part 25 and the peripheral portion including the end of the fourth edge area and/or between the second short side jig part 25 and the printed circuit film FPC.

In this manner, during the process of coupling the edge areas of the display panel PN with the respective side window parts of the curved window W via the first coupling member AM1, it may be possible to prevent the peripheral portion including the end of the fourth edge area of the display panel PN protruding downward from the lower surface 20c of the second short side jig part 25 and the printed circuit film FPC from being bent in the expansion direction by virtue of the protective cap 30.

Accordingly, it may be possible to prevent that the first signal lines and the second signal lines are disconnected, which may occur in case that the peripheral portion including the end of the fourth edge area and/or the printed circuit film FPC that transmits various driving signals to the driver chip IC and/or pixels in each display area of the display panel PN are bent. As a result, it may be possible to prevent driving failure.

Hereinafter, a method of fabricating display devices will be described. In the following description, the same or similar elements will be denoted by the same or similar reference numerals, and redundant descriptions will be omitted or briefly described.

A method of fabricating display devices according to an embodiment of the disclosure relates to a method of attaching a display panel to a curved window using the apparatus 100 for fabricating display devices described above with reference to FIGS. 14 and 15. A more detailed description thereon will be given below.

Figure 16:
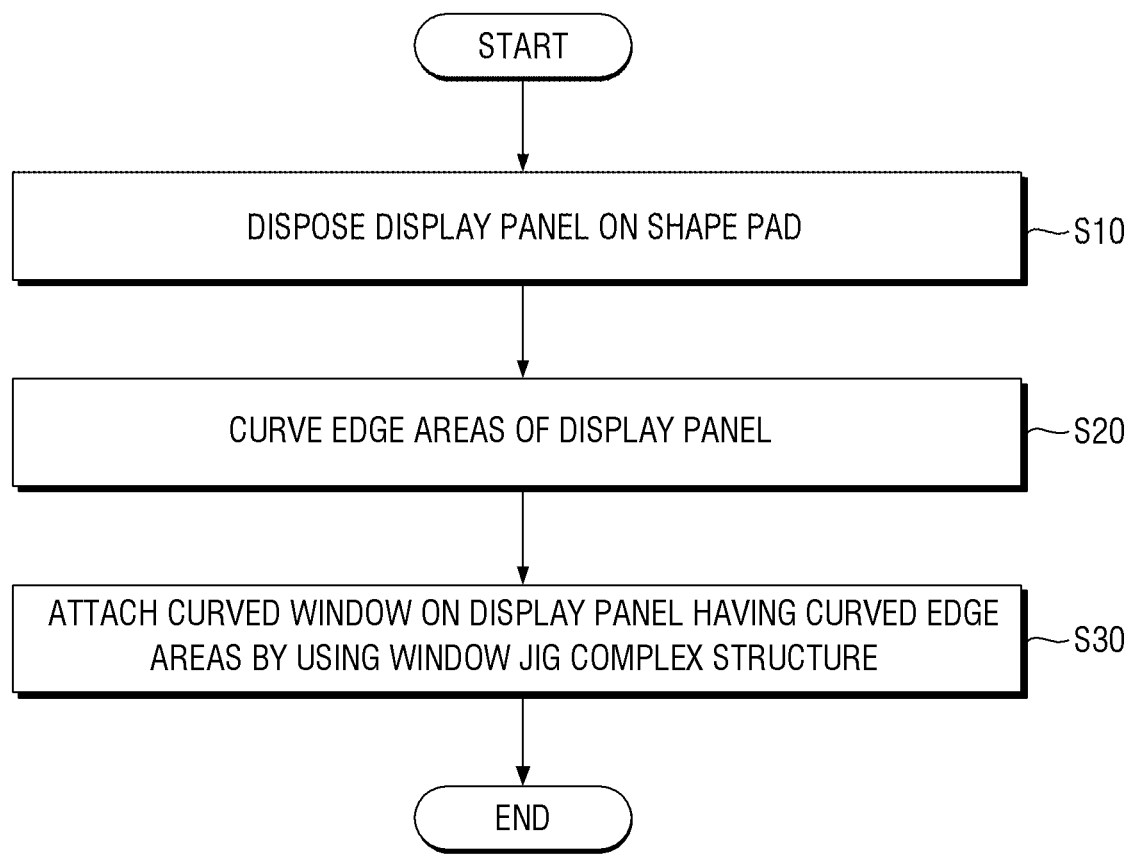
FIG. 16 is a flowchart for illustrating a method for fabricating a display device according to an embodiment of the disclosure.
Figure 26:
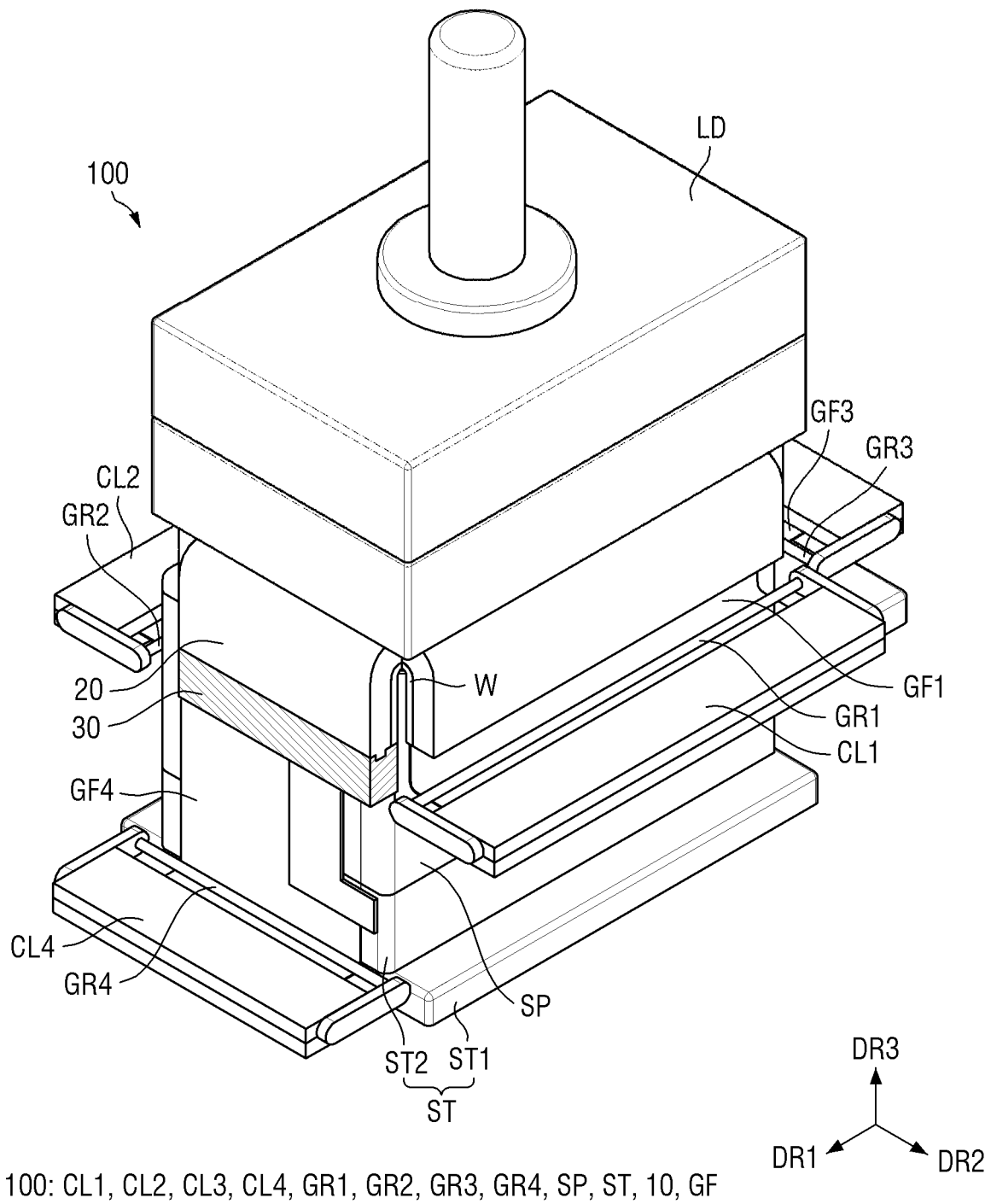
Figure 27:
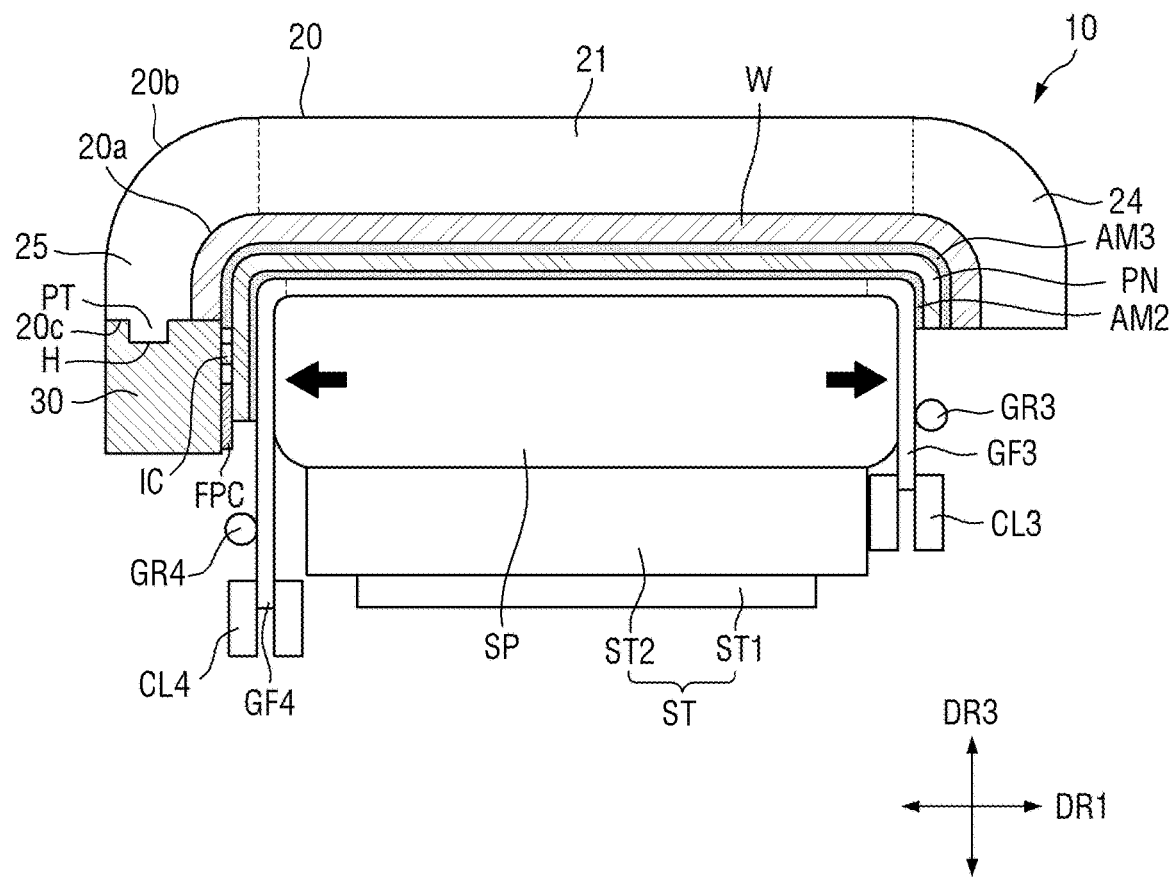
Figure 28:
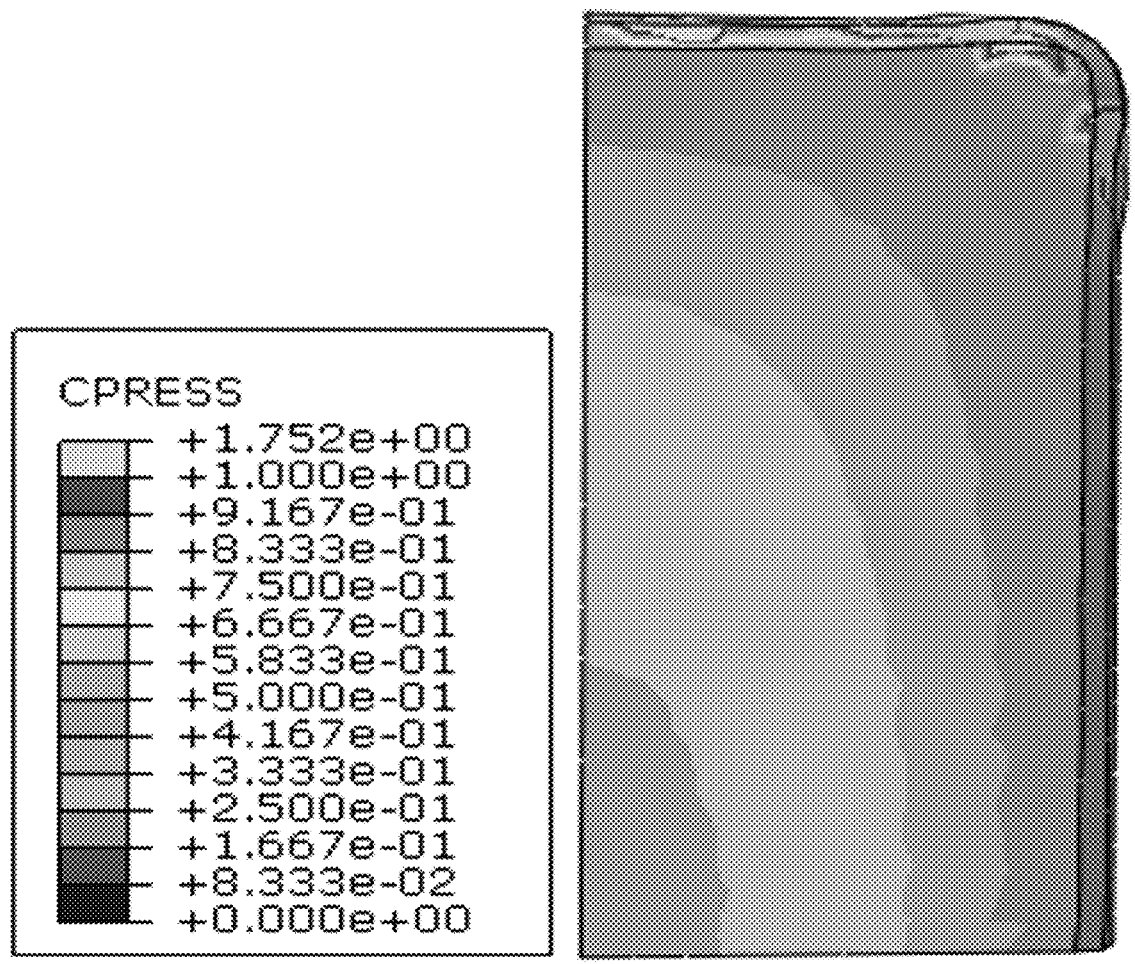
FIG. 28 is a schematic view showing that a pressure may be increased at the main display area adjacent to the edge area of the display panel during a lamination process between the display panel and the curved window.

FIG. 16 is a flowchart for illustrating a method for fabricating a display device according to an embodiment of the disclosure. FIGS. 17, 20, 22, 24 and 26 are schematic cross-sectional views showing processing steps of a method of fabricating display devices according to an embodiment of the disclosure. FIGS. 18, 19, 21, 23, 25 and 27 are schematic cross-sectional views showing processing steps of a method of fabricating display devices according to an embodiment of the disclosure. FIG. 28 is a schematic view showing that a pressure may be increased at the main display area adjacent to the edge area of the display panel during a lamination process between the display panel and the curved window.

Figure 17:
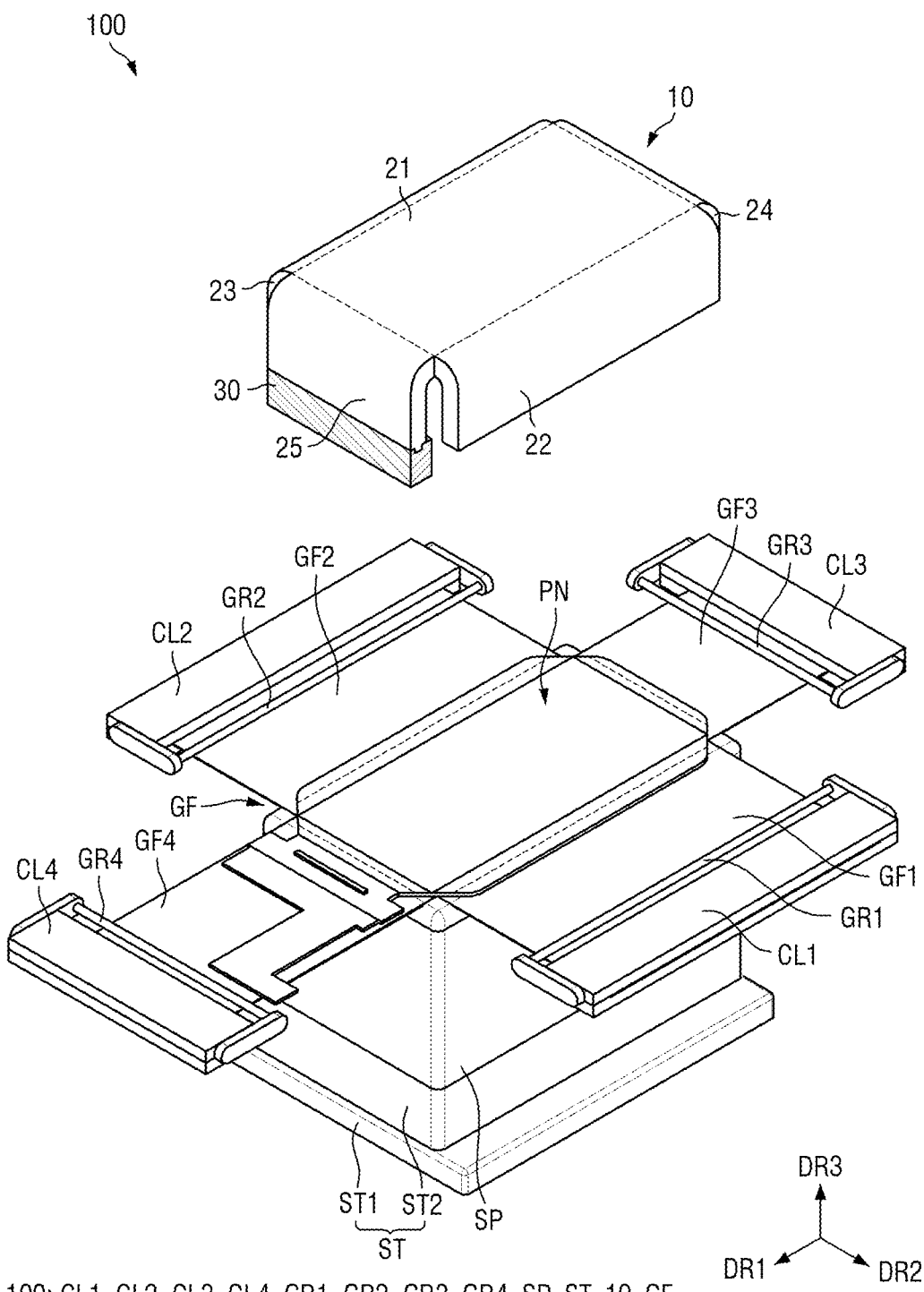
FIGS. 17, 20, 22, 24 and 26 are schematic cross-sectional views showing processing steps of a method of fabricating display devices according to an embodiment of the disclosure.
Figure 18:
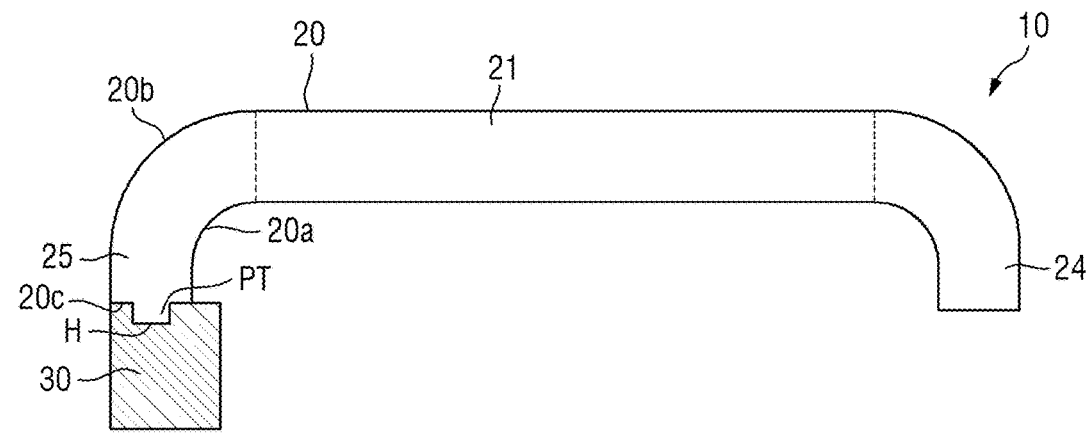
FIGS. 18, 19, 21, 23, 25 and 27 are schematic cross-sectional views showing processing steps of a method of fabricating display devices according to an embodiment of the disclosure.
Figure 18:
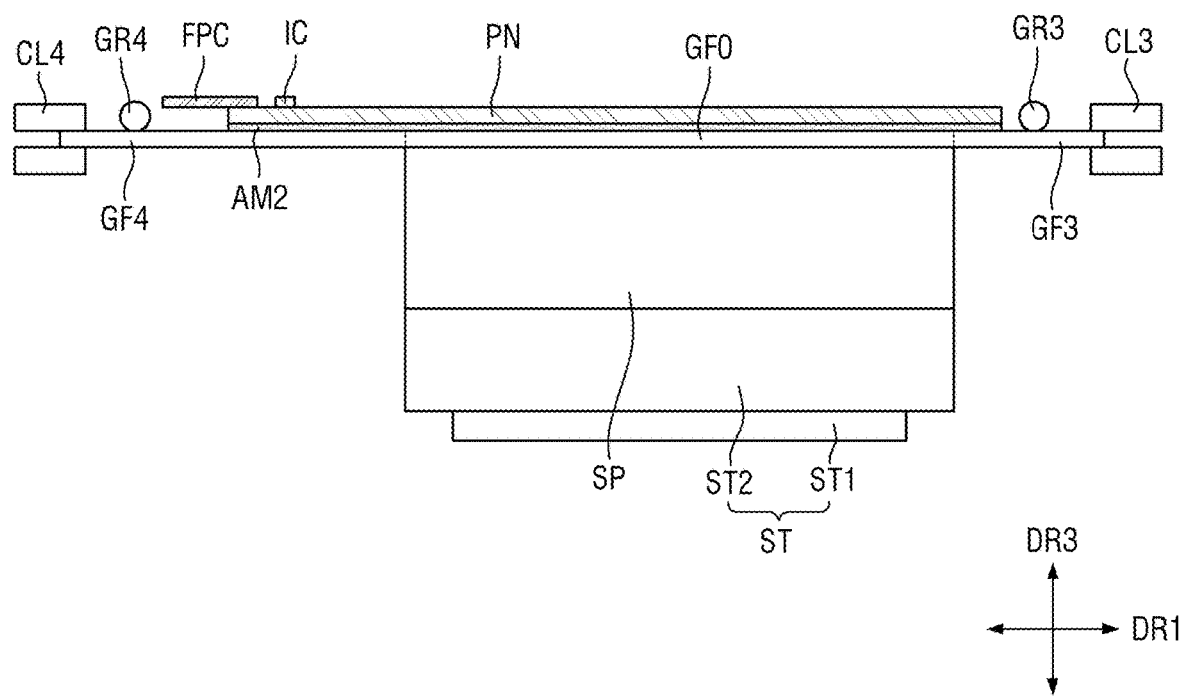

Initially, referring to FIGS. 5 and 6 in conjunction with FIGS. 16, 17, and 18, an apparatus 100 for fabricating display devices and a display panel PN may be prepared. The display panel PN may be disposed on a shape pad SP of the apparatus 100 (step S10). The display panel PN may be disposed on a guide film GF on the shape pad SP. A main display area DA0 of the display panel PN may be disposed to overlap a main film part GF0 of the guide film GF and the shape pad SP, while the edge areas may be disposed to overlap the film parts GF1 to GF4, respectively. The size of the main film part GF0 may be equal to the size of the main display area DA0 when viewed from the top. The sizes of the film parts GF1 to GF4 may be larger than the sizes of the edge areas of the display panel PN, respectively, when viewed from the top. The film parts GF1 to GF4 may be aligned with the boundaries between the main display area DA0 and the respective edge areas. The fourth film part GF4 may cover the fourth edge area and may cover the driver chip IC and a part of the printed circuit film FPC disposed in the fourth edge area.

Between the preparing the apparatus 100 and the disposing the display panel PN on the guide film GF, a release film SF of the guide film GF may be removed. The display panel PN may be attached on the second coupling member AM2 exposed by removing the release film SF.

Figure 19:
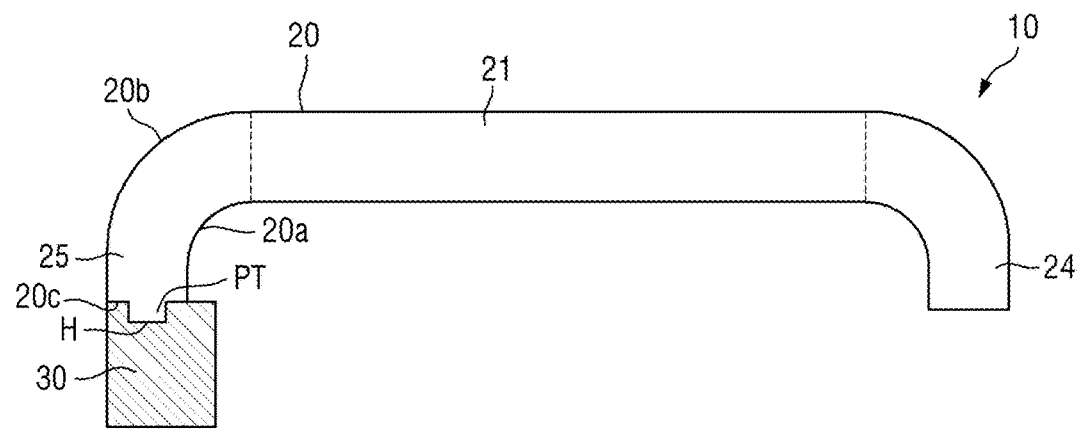
Figure 19:
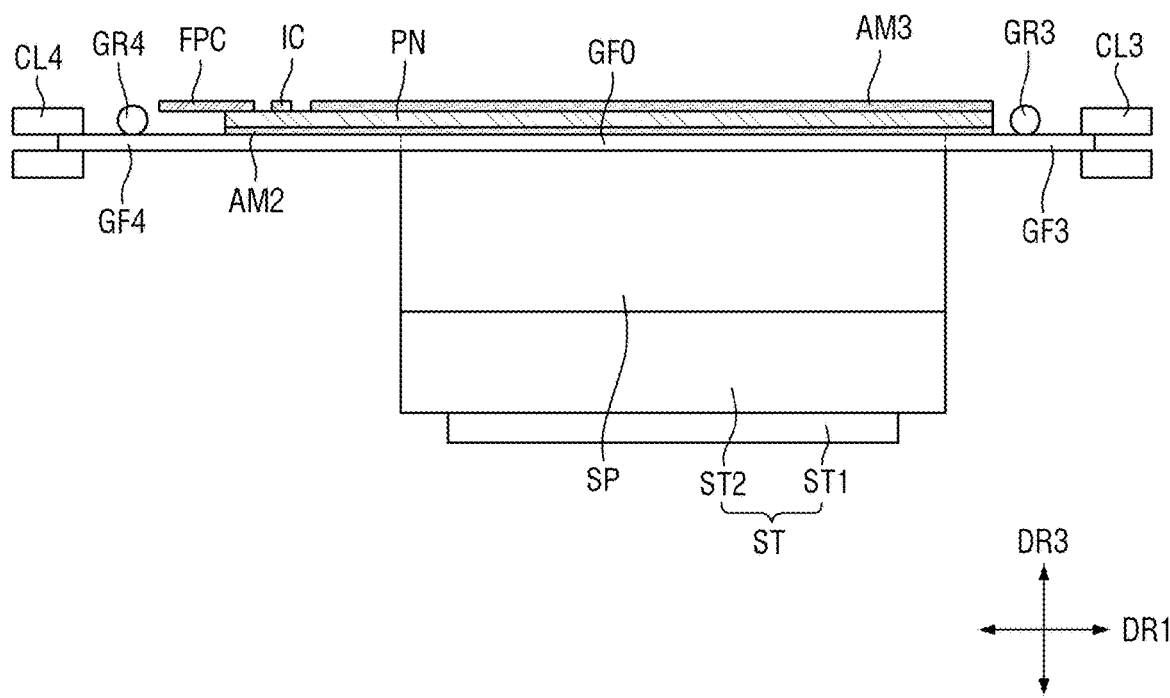

Subsequently, referring to FIG. 19, a third coupling member AM3 may be disposed on the display panel PN. The third coupling member AM3 may refer to the same element as the first coupling member AM1 described above with reference to FIG. 7. The first coupling member AM1 has been described above with reference to FIG. 7; and, therefore, the redundant description will be omitted. The third coupling member AM3 may be formed in a location where a curved window W (see FIG. 22) is to be attached.

Figure 20:
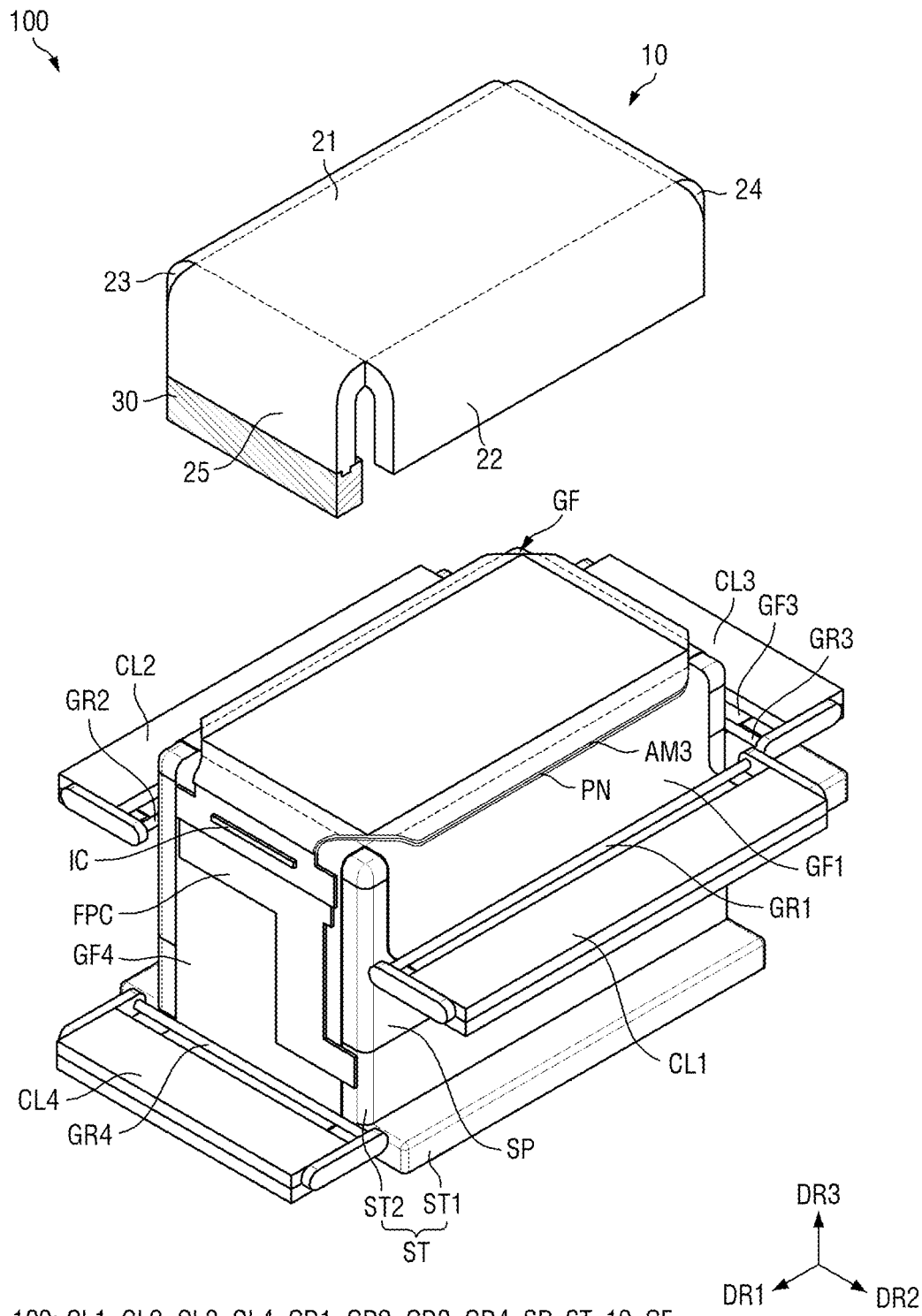
Figure 21:
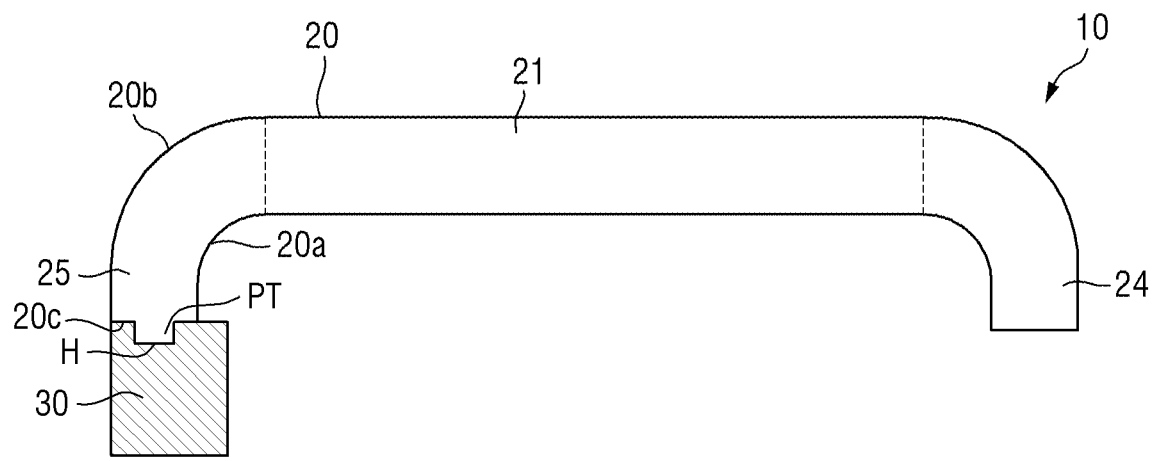
Figure 21:
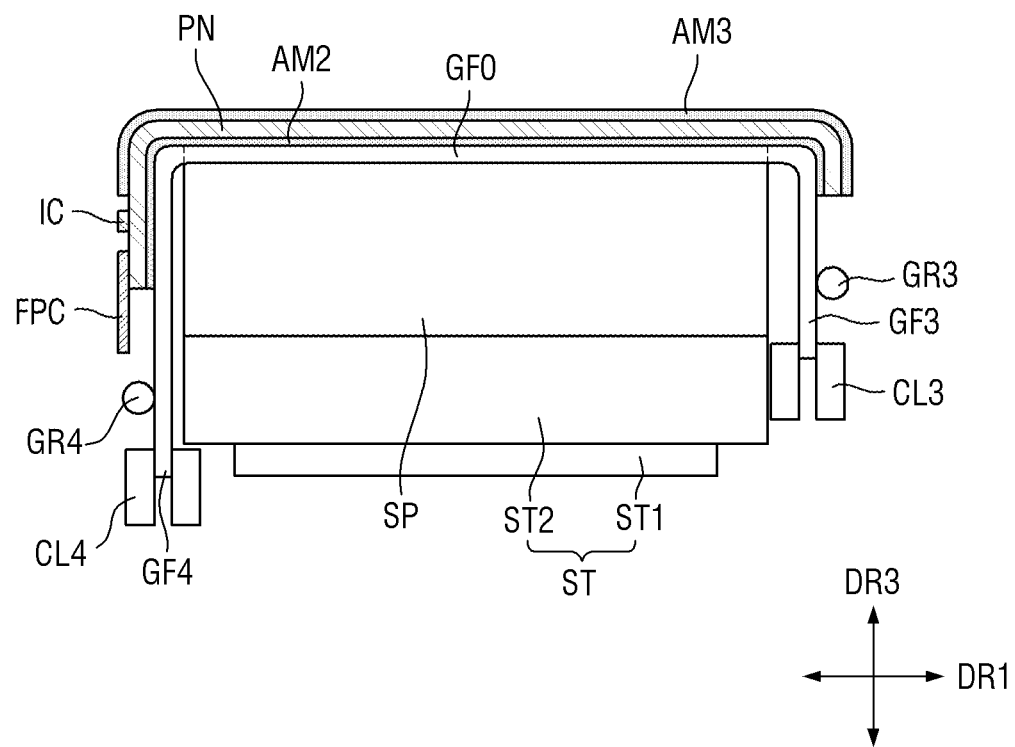

Subsequently, referring to FIGS. 5 and 6 in conjunction with FIGS. 16, 20 and 21, each edge area of the display panel PN may be curved (Step S20).

The edge areas of the display panel PN may be curved by using the guide film GF. More specifically, the film parts GF1 to GF4 excluding the main film part GF0 may be lowered by using the guide rollers GR1 to GR4 extended to the clamps CL1 to CL4, respectively, so that the edge areas of the display panel PN are bent from the main display area DA0, to form the curved display panel PN. The area of the film parts GF1 to GF4 from the main film part GF0 to the respective guide rollers GR1 to GR4 may be extended in the third direction DR3 (thickness direction), and the area of the film parts GF1 to GF4 from the guide roller GR1 to GR4 to the ends fixed by the clamps CL1 to CL4 may be extended in the second direction DR2 or the first direction DR1.

According to a method of fabricating a display device according to an embodiment, before laminating the display panel PN on the curved window W (see FIG. 22) to be described later, by linearly deforming each of the edge areas of the display panel PN, it may be possible to prevent physical damage which may occur in case that the edge areas of the display panel PN extended in the horizontal direction (the first direction DR1 or the second direction DR2) comes in contact with the curved window W.

By curving the edge areas of the display panel PN in advance, during the process of attaching the display panel PN and the curved window W together, which will be described later, it is possible to facilitate the migration of bubbles in the third coupling member AM3 between the edge areas of the display panel PN and the stress window parts of the curved window W (see FIG. 22) to the outside (outside of the end of the third coupling member AM3 located around the ends of the edge areas and/or ends of the side window parts).

Subsequently, referring to FIGS. 16, 22 and 27, the curved window W may be attached on the display panel PN having the curved edge areas using the window jig complex structure 10 (step S30). The attaching the curved window W on the display panel PN having the curved edge areas by using the window jig complex structure 10 may include disposing the curved window W on the window jig complex structure, bringing the curved window W into contact with the display panel PN, and applying a pressure from above the window jig complex structure 10 by using a lamination device.

Figure 22:
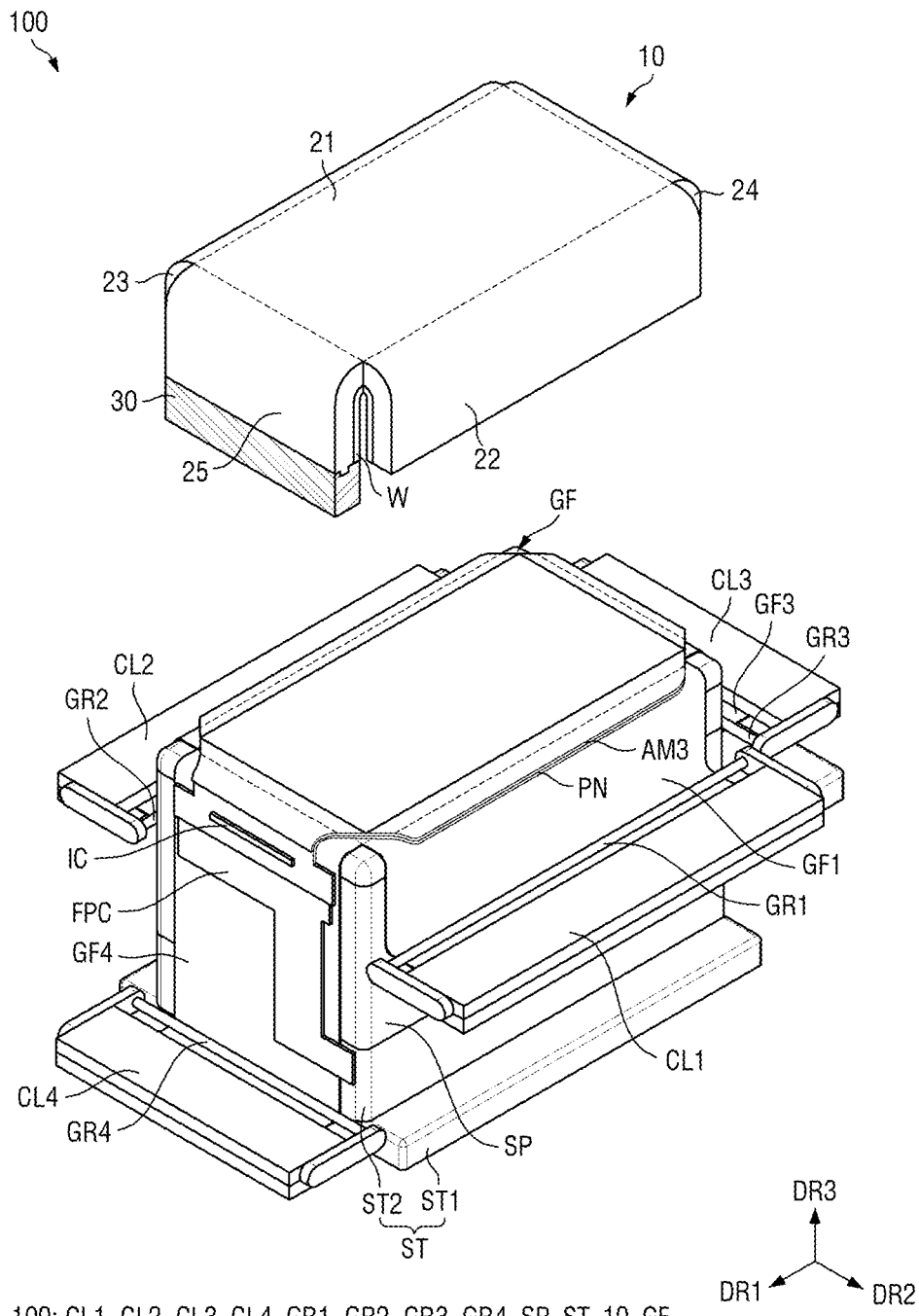
Figure 23:
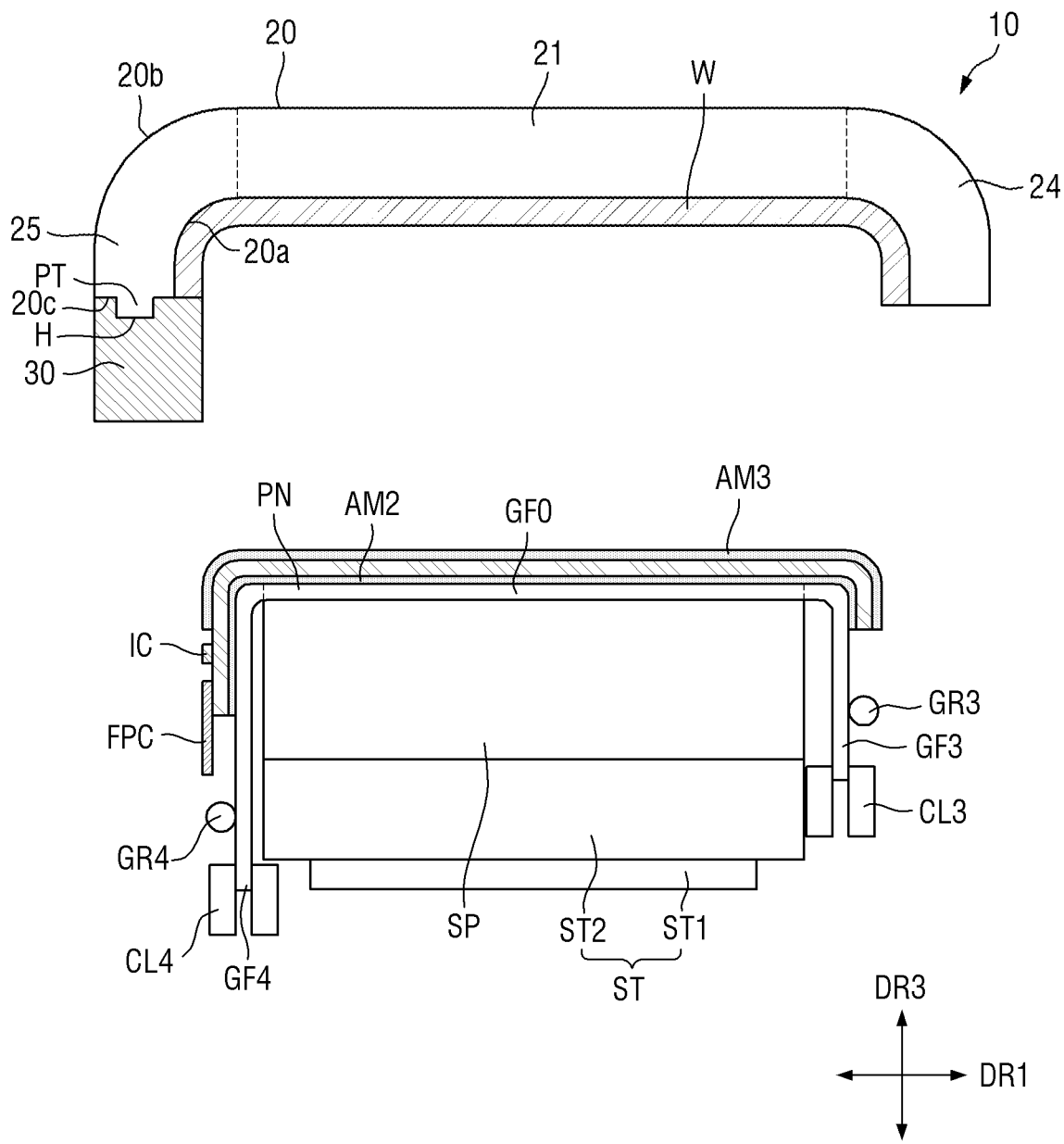

First, referring to FIGS. 16, 22 and 23, in the disposing the curved window W on the window jig complex structure 10, the curved window W may be fixed by the window jig 20. The side window parts may be bent in the thickness direction from the sides of the main window part, respectively, and may be extended. The degree or angle by which the jig parts 22 to 25 are bent from the main jig part 21 may be equal to or less than the degree or angle by which the side window parts of the curved window W are bent from the main window part.

Figure 24:
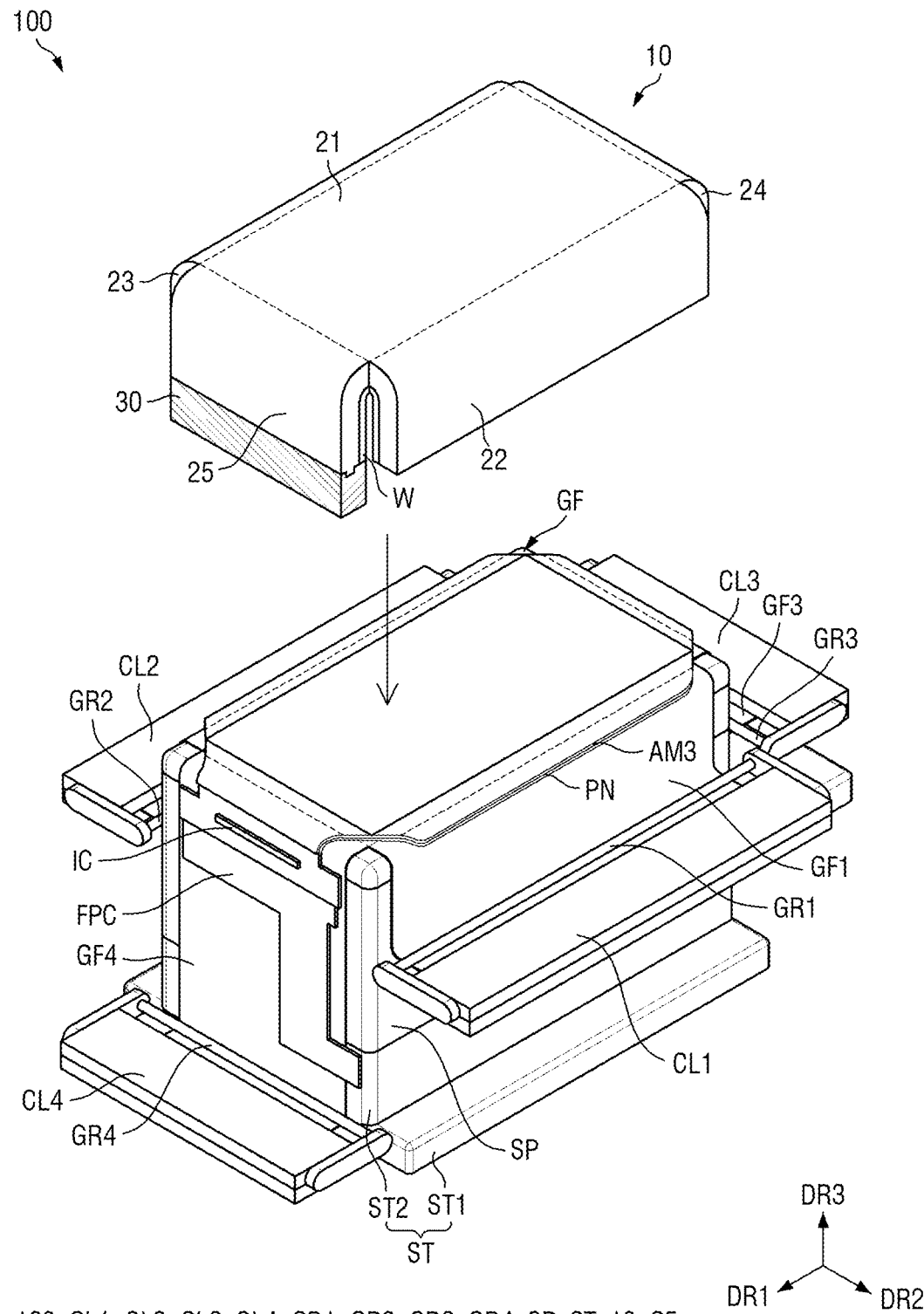

Subsequently, referring to FIGS. 16 and 24, the bringing the curved window W into contact with the display panel PN may include moving the curved window W fixed to the window jig complex structure downward toward the display panel PN (e.g., toward another side in the third direction DR3).

In some embodiments, the bringing the curved window W into contact with the display panel PN may include moving the display panel PN toward the curved window W upward (e.g., toward the side in the third direction DR3), with the curved window W fixed to the window jig complex structure 10.

The display panel PN may be moved upward toward the curved window W (e.g., toward the side in the third direction DR3) by supplying a fluid to the shape pad SP to expand it. It is, however, to be understood that the disclosure is not limited thereto. It may also be moved by raising a stage ST to which a power device may be connected.

In some embodiments, the bringing the curved window W into contact with the display panel PN may include moving the display panel PN toward the curved window W upward (e.g., toward the side in the third direction DR3) and moving the curved window W fixed to the window jig complex structure 10 toward the display panel PN downward (e.g., another side in the third direction DR3).

Figure 25:
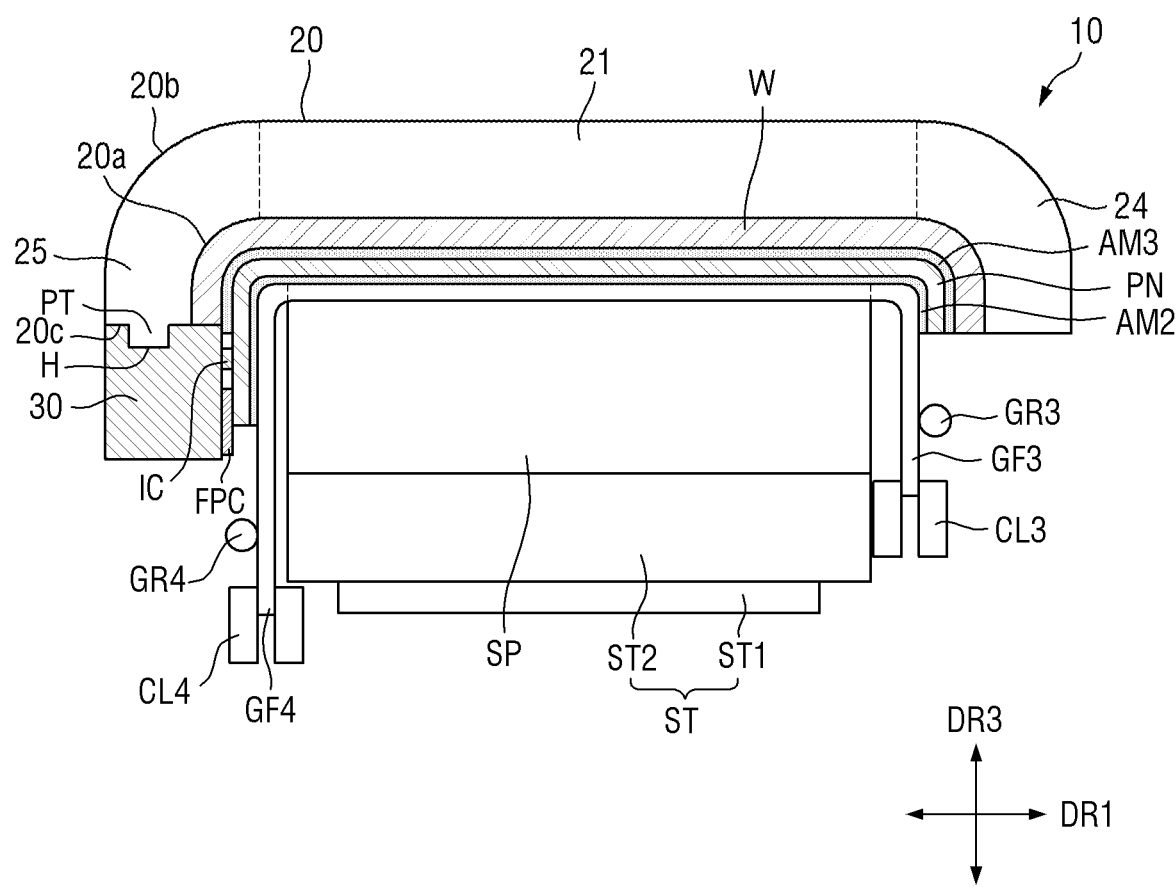

According to an embodiment of the disclosure, by bringing the curved window W into contact with the display panel PN, the curved window W may be attached to the display panel PN via a third coupling member AM3, as shown in FIG. 25.

Subsequently, referring to FIGS. 16, 26 and 27, the method may include applying a pressure from above the window jig complex structure 10 using a lamination device LD.

In case that a pressure is applied from above the window jig complex structure 10 using the lamination device LD, the main window part of the curved window W may be coupled with the main display area DA0 of the display panel PN firstly. The shape pad SP may be expanded to the outside in the first direction DR1 (hereinafter referred to as the expansion direction) due to the pressure applied from the above. The shape pad SP expanded in the first direction DR1 moves the edge areas of the display panel PN in the expansion direction, so that the edge areas of the display panel PN may be coupled with the respective side window parts of the curved window W via the third coupling member AM3.

During the process of coupling the edge areas of the display panel PN with the respective side window parts of the curved window W via the third coupling member AM3, the peripheral portion including the end of the fourth edge area of the display panel PN protruding downward from the lower surface 20c of the second short side jig part 25 and the printed circuit film FPC may be bent in the expansion direction by the fourth side window part of the curved window W and the second short side jig part 25.

At the fourth edge area of the display panel PN, first pads electrically connected to the driver chip IC, first signal lines electrically connected to the first pads, second pads electrically connected to the printed circuit film FPC, and second signal lines electrically connected to the second pads, as described above with reference to FIG. 5. Accordingly, if the peripheral portion including the end of the fourth edge area is bent, the first signal lines and the second signal lines may be disconnected. If the first signal lines and the second signal lines are disconnected, driving failure may occur. If the printed circuit film FPC that transmits a variety of driving signals to the driver chip IC and/or pixels in each display area of the display panel PN is bent, a variety of signal lines on the printed circuit film FPC may also be disconnected. If the various circuit signal lines on the printed circuit film FPC are disconnected, driving failure may occur.

In this regard, as described above, the window jig complex structure 10 according to the embodiment of the disclosure may include a protective cap 30 that covers the end (or lower surface) of the second side window part of the curved window W, and the lower surface 20c of the second short side jig part 25 in the thickness direction. The protective cap 30 can support the peripheral portion including the end portion of the fourth edge area of the display panel PN protruding downward from the lower surface 20c of the second short side jig part 25 and the printed circuit film FPC on the outer side (e.g., in the expansion direction). More specifically, the protective cap 30 may be coupled with the lower surface 20c of the second short side jig part 25 to compensate for the difference between the second short side jig part 25 and the peripheral portion including the end of the fourth edge area and/or between the second short side jig part 25 and the printed circuit film FPC.

In this manner, during the process of coupling the edge areas of the display panel PN with the respective side window parts of the curved window W via the third coupling member AM3, it may be possible to prevent the peripheral portion including the end of the fourth edge area of the display panel PN protruding downward from the lower surface 20c of the second short side jig part 25 and the printed circuit film FPC from being bent in the expansion direction by virtue of the protective cap 30.

Accordingly, it may be possible to prevent that the first signal lines and the second signal lines are disconnected, which may occur in case that the peripheral portion including the end of the fourth edge area and/or the printed circuit film FPC that transmits various driving signals to the driver chip IC and/or pixels in each display area of the display panel PN are bent. As a result, it may be possible to prevent driving failure.

Furthermore, as shown in FIG. 28, the protective cap 30 of the window jig complex structure 10 according to the embodiment of the disclosure covers and supports the end (or lower surface) of the second side window part of the curved window W and the lower surface 20c of the second short side jig part 25 in the thickness direction, as described above. Accordingly, the shape pad expanded in the expansion direction (e.g., the first direction DR1 or the second direction DR2) may be expanded again in the upper direction (e.g., the third direction DR3). In this manner, in the areas where the applied pressure may be insufficient for coupling, such as the main display area DA0 adjacent to the edge areas of the display panel PN and the main window part adjacent to the side window parts of the curved window W, the coupling force between the main display area DA0 adjacent to the edge areas of the display panel PN and the side window parts of the curved window W can be increased.

Although embodiments of the invention have been disclosed for illustrative purposes, those skilled in the art will appreciate that various modifications, additions and substitutions are possible, without departing from the scope and spirit of the invention as disclosed in the accompanying claims, including their equivalents.

What is claimed is:

1. A window jig complex structure comprising:
    a window jig; and
    a protective cap extended from the window jig,
    wherein the window jig comprises:
        a main jig part having longer sides extended in a first direction and shorter sides extended in a second direction;
        a first short side jig part bent from one of the shorter sides of the main jig part in a thickness direction at a first side of the main jig part; and
        a second short side jig part bent from another of the shorter sides of the main jig part at a second side of the main jig part, and wherein the protective cap is coupled with the second short side jig part.

2. The window jig complex structure of claim 1, wherein the window jig further comprises:
- a first long-side jig part bent from one of the longer sides of the main jig part in the thickness direction at a third side of the main jig part; and
- a second long-side jig part bent from another of the longer sides of the main jig part in the thickness direction at a fourth side of the main jig part.

3. The window jig complex structure of claim 2, wherein the window jig comprises:
- an inner surface;
- an outer surface opposite to the inner surface; and
- a lower surface extending the inner surface to the outer surface, and
- the protective cap covers the lower surface of the second short side jig part.

4. The window jig complex structure of claim 3, wherein the protective cap is coupled to the lower surface of the second short side jig part.

5. The window jig complex structure of claim 4, wherein the window jig further comprises a protrusion protruding from the lower surface of the second short side jig part, the protective cap further comprises a groove engaged with the protrusion, and
the protrusion is accommodated in the groove.

6. The window jig complex structure of claim 4, wherein the window jig further comprises a magnet disposed in the second short side jig part, and
the protective cap includes a conductive material.

7. The window jig complex structure of claim 3, wherein a window is mounted on the inner surface of the window jig,
an end of the window adjacent to the second short side jig part of the window protrudes downward from the lower surface of the second short side jig part,
the window comprises an inner surface, an outer surface opposite to the inner surface, and a lower surface extending the inner surface to the outer surface, and
the protective cap covers the outer surface of the window and the lower surface of the window.

8. The window jig complex structure of claim 3, wherein a window is mounted on the inner surface of the window jig,
a lower surface of the second short side jig part protrudes downward from an end of the window that is adjacent to the second short side jig part,
the window comprises an inner surface, an outer surface opposite to the inner surface, and a lower surface extending the inner surface to the outer surface, and
the protective cap covers the lower surface of the window and a part of the inner surface of the second short side jig part.

9. The window jig complex structure of claim 2, wherein the window jig comprises an inner surface, an outer surface opposite to the inner surface, and a lower surface extending the inner surface to the outer surface,
the protective cap covers a lower end of the outer surface of the second short side jig part and the lower surface,
the protective cap is coupled with the outer surface of the second short side jig part,
the window jig further comprises a protrusion protruding from the outer surface of the second short side jig part,
the protective cap further comprises a groove engaged with the protrusion, and
the protrusion is accommodated in the groove.

10. An apparatus for fabricating a display device, the apparatus comprising:
- a stage;
- a shape pad on the stage; and
- a window jig complex structure disposed on the shape pad and comprising a window jig and a protective cap extended from the window jig,
wherein the window jig comprises:
- a main jig part having longer sides extended in a first direction and shorter sides extended in a second direction;
- a first short side jig part bent from one of the shorter sides of the main jig part in a thickness direction at a first side of the main jig part; and
- a second short side jig part bent from another of the shorter sides of the main jig part at a second side of the main jig part, and
wherein the protective cap is coupled with the second short side jig part.

11. The apparatus of claim 10, wherein the window jig further comprises:
- a first long-side jig part bent from one of the longer sides of the main jig part in the thickness direction at a third side of the main jig part; and
- a second long-side jig part bent from another of the longer sides of the main jig part in the thickness direction at a fourth side of the main jig part.

12. The apparatus of claim 11, further comprising:
- a guide film disposed between the shape pad and the window jig complex structure;
- at least one clamp fixing an end of the guide film; and
- at least one guide roller extended from the clamp and disposed on the guide film.

13. The apparatus of claim 12, wherein the guide film comprises:
- a main film part;
- a first film part located at one side of the main film part in the second direction;
- a second film part located at an opposite side of the main film part in the second direction;
- a third film part located at one side of the main film part in the first direction; and
- a fourth film part located at an opposite side of the main film part in the first direction, and wherein the main film part overlaps the shape pad in the thickness direction.

14. The apparatus of claim 13, wherein
the at least one clamp comprises a plurality of clamps, and
the plurality of clamps draw and fix an end of the first film part, an end of the second film part, an end of the third film part and an end of fourth film part, respectively.

15. The apparatus of claim 14, wherein
the at least one guide roller comprises a plurality of guide rollers,
the plurality of guide rollers are extended from the plurality of clamps, respectively,
the plurality of guide rollers are disposed between the main film part and the ends of the first to fourth film parts, and
the plurality of guide rollers lower the first film part, the second film part, the third film part, and the fourth film part, respectively.

16. A method of fabricating a display device, the method comprising:
disposing a display panel on a shape pad, the display panel comprising a main display area comprising longer sides extended in a first direction and shorter sides extended in a second direction, and edge areas extended from the main area;

curving the edge areas of the display panel; and attaching a curved window on the display panel having the curved edge areas by using a window jig complex structure, wherein the edge areas comprise:
- a first edge area at a side of the main display area in the second direction;
- a second edge area at an opposite side of the main display area in the second direction;
- a third edge area at a side of the main display area in the first direction; and
- a fourth edge area at an opposite side of the main display area in the first direction, the fourth edge area being longer than the third edge area, wherein the window jig complex structure comprises a window jig, and a protective cap extended from the window jig, wherein the window jig comprises:
- a main jig part in line with the main display area;
- a first long-side jig part covering the first edge area;
- a second long-side jig part covering the second edge area;
- a first short side jig part covering the third edge area; and
- a second short side jig part covering the fourth edge area, and wherein the protective cap is coupled to the second short side jig part.

17. The method of claim 16, wherein the display panel further comprises:
- a driver chip disposed in a first pad area of the fourth edge area; and
- a printed circuit film disposed on a second pad area of the fourth edge area.

18. The method of claim 17, wherein
the disposing of the display panel comprises disposing the display panel on a guide film on the shape pad, and
the guide film comprises:
- a main film part covering the main display area;
- a first film part covering the first edge area;
- a second film part covering the second edge area;
- a third film part covering the third edge area; and
- a fourth film part covering the fourth edge area.

19. The method of claim 18, wherein the disposing of the display panel comprises fixing ends of the first film part, the second film part, the third film part, and the fourth film part by clamps.

20. The method of claim 19, wherein the curving of the edge areas of the display panel comprises:
lowering the first film part, the second film part, the third film part, and the fourth film part by guide rollers extended from the clamps to bend the first edge area, the second edge area, the third edge area, and the fourth edge area of the display panel from the main display area.

21. The method of claim 20, wherein
the attaching of the curved window on the display panel comprises lowering the curved window or raising the display panel, and
the protective cap covers the fourth edge area of the display panel.

* * * * *